United States Patent
Takato

(10) Patent No.: US 8,824,067 B2
(45) Date of Patent: Sep. 2, 2014

(54) ENDOSCOPE OBJECTIVE OPTICAL SYSTEM

(71) Applicant: Olympus Medical Systems Corp., Tokyo (JP)

(72) Inventor: Hideyasu Takato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/892,465

(22) Filed: May 13, 2013

(65) Prior Publication Data

US 2013/0314805 A1 Nov. 28, 2013

Related U.S. Application Data

(63) Continuation of application No. PCT/JP2012/077567, filed on Oct. 25, 2012.

(30) Foreign Application Priority Data

Nov. 22, 2011 (JP) .................................. 2011-255094

(51) Int. Cl.
*G02B 9/06* (2006.01)
*G02B 21/02* (2006.01)

(52) U.S. Cl.
USPC ........... 359/794; 359/656; 359/657; 359/658; 359/659; 359/660

(58) Field of Classification Search
USPC .................................. 359/665–661, 794, 782
See application file for complete search history.

(56) References Cited

U.S. PATENT DOCUMENTS

| | | | |
|---|---|---|---|
| 5,296,971 A | 3/1994 | Mori | |
| 5,530,591 A | 6/1996 | Tachihara et al. | |
| 6,181,481 B1* | 1/2001 | Yamamoto et al. | 359/661 |
| 2003/0189768 A1* | 10/2003 | Murayama | 359/782 |
| 2006/0221457 A1 | 10/2006 | Murayama | |
| 2007/0055100 A1 | 3/2007 | Kato et al. | |
| 2007/0188892 A1 | 8/2007 | Miyano | |
| 2009/0237811 A1 | 9/2009 | Inoue | |
| 2010/0076268 A1* | 3/2010 | Takasugi et al. | 600/171 |

FOREIGN PATENT DOCUMENTS

| | | |
|---|---|---|
| JP | 63-281112 | 11/1988 |
| JP | 04-275514 | 10/1992 |
| JP | 05-288985 | 11/1993 |
| JP | 07-174966 | 7/1995 |

(Continued)

OTHER PUBLICATIONS

International Search Report, dated Jan. 29, 2013, issued in corresponding International Application No. PCT/JP2012/077567.

*Primary Examiner* — Scott J Sugarman
*Assistant Examiner* — Mustak Choudhury
(74) *Attorney, Agent, or Firm* — Kenyon & Kenyon LLP

(57) ABSTRACT

Provided is an endoscope objective optical system that is constituted of, in order from the object side, a positive first group, an aperture stop, and a positive second group, wherein the first group is constituted of a negative first lens whose surface on the object side is flat and a positive second lens; the second group is constituted of a combined lens formed of a positive third lens and a negative fourth lens; and Conditional Expressions (1) to (3) are satisfied. F31, F32, and f are the focal lengths of the third lens, the fourth lens, and the entire system, respectively; and R3 and R4 are the radii of curvature at the object-side surface and the image-side surface of the second lens, respectively. $1.2<f31/f<1.55$ ... (1), $-2.8<f32/f<-1.98$ ... (2), and $0.38<|R4+R3|/|R4-R3|<0.77$ ... (3).

4 Claims, 23 Drawing Sheets

(56) References Cited

FOREIGN PATENT DOCUMENTS

| JP | 2001-154100 | 6/2001 |
|----|-------------|--------|
| JP | 2004-117607 | 4/2004 |
| JP | 2005-148508 | 6/2005 |
| JP | 2005-323874 | 11/2005 |
| JP | 2006-003549 | 1/2006 |
| JP | 2006-276779 | 10/2006 |
| JP | 2007-334291 | 12/2007 |
| JP | 2009-258659 | 11/2009 |
| JP | 2010-097208 | 4/2010 |

* cited by examiner

ENDOSCOPE OBJECTIVE OPTICAL SYSTEM

CROSS-REFERENCE TO RELATED APPLICATIONS

This is a continuation of International Application PCT/JP2012/077567, with an international filing date of Oct. 25, 2012, which is hereby incorporated by reference herein in its entirety. This application claims the benefit of Japanese Patent Application No. 2011-255094, the content of which is incorporated herein by reference.

TECHNICAL FIELD

The present invention relates to an endoscope objective optical system.

BACKGROUND ART

Endoscopes in which a general objective lens constituted of about three to five lenses is installed provide images by using mainly solid-state imaging devices, such as CCDs or the like (for example, see Patent Literatures 1 to 8).

CITATION LIST

Patent Literature

{PTL 1} Japanese Unexamined Patent Application, Publication No. 2009-258659
{PTL 2} Japanese Unexamined Patent Application, Publication No. 2007-334291
{PTL 3} Japanese Unexamined Patent Application, Publication No. 2006-276779
{PTL 4} Japanese Unexamined Patent Application, Publication No. 2005-148508
{PTL 5} Japanese Unexamined Patent Application, Publication No. 2004-117607
{PTL 6} Japanese Unexamined Patent Application, Publication No. Hei 7-174966
{PTL 7} Japanese Unexamined Patent Application, Publication No. Hei 5-288985
{PTL 8} Japanese Unexamined Patent Application, Publication No. Hei 4-275514

SUMMARY OF INVENTION

A first aspect of the present invention is an endoscope objective optical system including, in order from the object side, a first group, an aperture stop, and a second group, wherein the first group has positive power and is constituted of a negative first lens whose surface on the object side is flat and a positive second lens; the second group has positive power and is constituted of a combined lens formed of a positive third lens and a negative fourth lens; and the following Conditional Expressions (1) to (3) are satisfied:

$$1.2 < f31/f < 1.55, \qquad (1)$$

$$-2.8 < f32/f < -1.98, \text{ and} \qquad (2)$$

$$0.38 < |R4+R3|/|R4-R3| < 0.77, \qquad (3)$$

where $f31$ is the focal length of the third lens, $f32$ is the focal length of the fourth lens, $f$ is the focal length of the entire system, $R3$ is the radius of curvature of the object-side surface of the second lens, and $R4$ is the radius of curvature of the image-side surface of the second lens.

A second aspect of the present invention is an endoscope objective optical system including, in order from the object side a first group, an aperture stop, and a second group, wherein the first group has positive power and is constituted of a negative first lens whose surface on the object side is flat and a positive second lens; the second group has positive power and is constituted of a combined lens formed of a positive third lens and a negative fourth lens; and the following Conditional Expressions (1'), (2'), and (4) are satisfied:

$$1.39 < f31/f < 1.5, \qquad (1')$$

$$-2.52 < f32/f < -2.18, \text{ and} \qquad (2')$$

$$0.6 < g1/g2 < 1.08, \qquad (4)$$

where $g1$ is the focal length of the first group, and $g2$ is the focal length of the second group.

DESCRIPTION OF EMBODIMENT

An endoscope objective optical system 1 according to an embodiment of the present invention will be described below with reference to FIG. 1.

Figure 1:
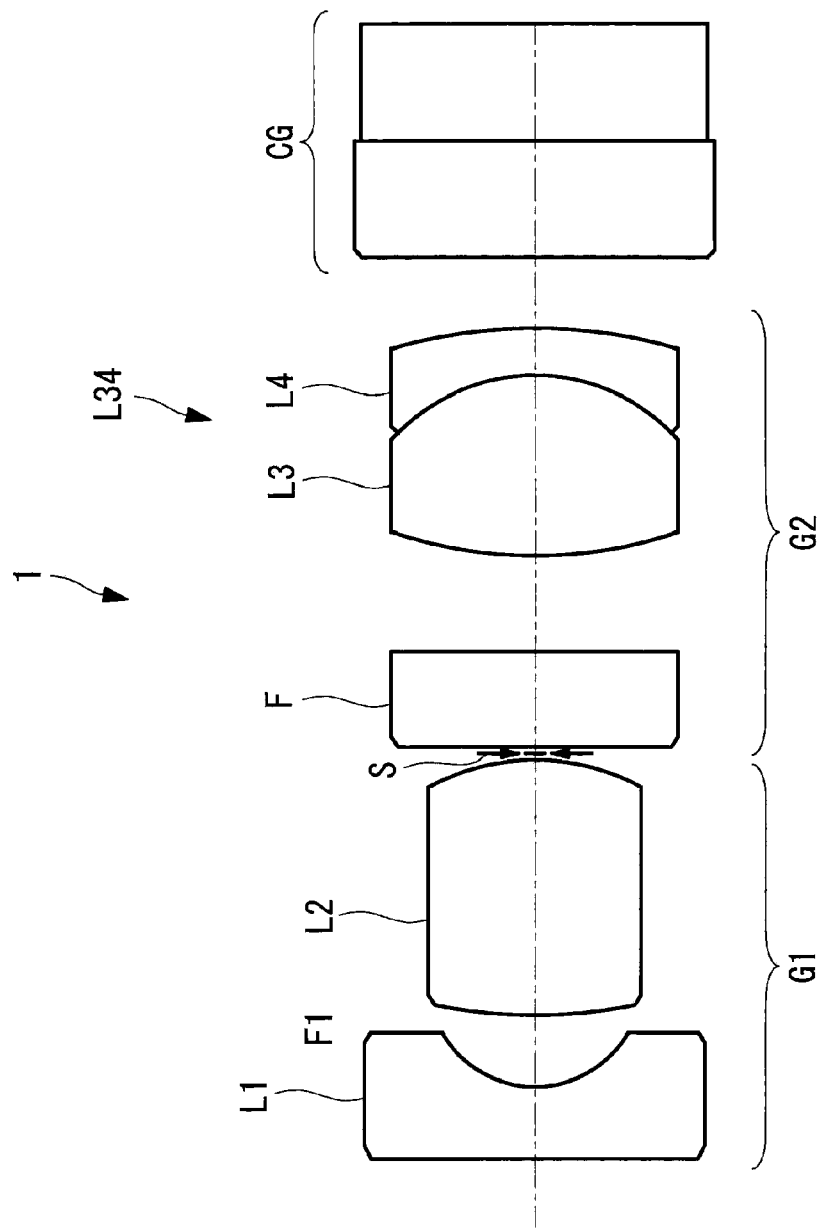
FIG. 1 is a cross-sectional view of lenses showing the overall configuration of an endoscope objective optical system according to an embodiment of the present invention.

As shown in FIG. 1, the endoscope objective optical system 1 according to this embodiment is constituted of, in order from the object side, a first group G1 that has positive refractive power, an aperture stop S, and a second group G2 that has a positive refractive power.

The first group G1 is constituted of, in order from the object side, a negative first lens L1 formed of a plano-concave lens whose flat surface faces the object side and a positive second lens L2 formed of a double-convex lens.

The second group G2 is constituted of a combined lens L34 in which a positive third lens L3 formed of a double-convex lens and a negative fourth lens L4 formed of a meniscus lens are attached to each other.

A flat-parallel plate F is disposed between the combined lens L34 and the aperture stop S. The flat-parallel plate F is a filter for cutting a specific wavelength, for example, 1060 nm of a YAG laser beam, 810 nm of a semiconductor laser beam, light in the near-infrared region, and so forth. The flat-parallel plate F may be disposed at a subsequent stage of the combined lens L34 or between the first lens L1 and the second lens L2 of the first group G1.

An imaging device (not shown) is disposed near an image plane of the endoscope objective optical system 1 and constitutes an imaging optical system together with the endoscope objective optical system 1. A cover glass CG for protecting an imaging surface is attached to the imaging device.

Here, the endoscope objective optical system 1 satisfies the following Conditional Expressions (1) to (3).

$$1.2 < f31/f < 1.55 \quad (1)$$

$$-2.8 < f32/f < -1.98 \quad (2)$$

$$0.38 < |R4+R3|/|R4-R3| < 0.77 \quad (3)$$

Here, f31 is the focal length of the third lens L3, f32 is the focal length of the fourth lens L4, f is focal length of the entire system, R3 is the radius of curvature of the object-side surface of the second lens L2, and R4 is the radius of curvature of the image-side surface of the second lens L2.

In general, the lens type used to realize a wide viewing angle is of the retrofocus type whose configuration is such that the first group G1 is negative and the second group G2 is positive. The objective optical systems according to this embodiment are also of the retrofocus type. Specifically, the first lens L1 is formed of a negative lens, and the combined focal length of the subsequent lens system is positive. However, in consideration of the aberration correction of the optical system, it is desirable that the configurations before and after the aperture stop S be symmetrical. Because of this, of various types of endoscope objective optical systems, it is desirable that, as in the configurations of this embodiment, the group configurations before and after the aperture stop S be such that both groups have positive power, and the detailed lens configuration be such that a negative lens, a positive lens, an aperture stop S, a positive lens, and a negative lens be included in this order from the object side. Furthermore, in order to correct the chromatic aberration, it is necessary to employ the positive lens L3 and negative lens L4 of the second group in the form of a combined lens L34.

Conditional Expression (1) and Conditional Expression (2) are conditional expressions mainly for correcting the magnification chromatic aberration.

When f31/f is equal to or greater than the upper limit in Conditional Expression (1), this is not desirable because the magnification chromatic aberration is exacerbated, and thus, the C line is inclined to the under side and the F line is inclined to the over side. It is similar when f32/f is equal to or less than the lower limit in Conditional Expression (2). On the other hand, when f31/f is equal to or less than the lower limit in Conditional Expression (1), because the F line is inclined to the over side and because the g line in particular is considerably shifted to the positive side, the performance is markedly deteriorated at the periphery of the viewing surface. Similarly, when f32/f is equal to or greater than the upper limit in Conditional Expression (2), the g line is greatly inclined to the over side.

Conditional Expression (1) and Conditional Expression (2) may take the following ranges. With the ranges of Conditional Expressions (1') and (2') below, it is also possible to achieve effects similar to those achieved with Conditional Expression (1) and Conditional Expression (2).

$$1.39 < f31/f < 1.62 \quad (1')$$

$$-2.52 < f32/f < -2.18 \quad (2')$$

By restricting the lower limit of Conditional Expression (1') as described above, Conditional Expression (1) achieves a greater effect. Furthermore, by imposing restrictions as in Conditional Expression (2'), it becomes even easier to correct the magnification chromatic aberration. Although the upper limit of Conditional Expression (1') is greater than the upper limit of Conditional Expression (1), because the upper limit of Conditional Expression (2') is restricted as compared with Conditional Expression (2), it is possible to suppress the deterioration of the chromatic aberration even if the upper limit of Conditional Expression (1) is relaxed by the corresponding amount.

Conditional Expression (3) is a conditional expression that relates to the Petzval sum.

When |R4+R3|/|R4−R3| is equal to or less than the lower limit in Conditional Expression (3), this is not desirable because the Petzval sum takes a negative value, and thus, the image plane is tilted to the positive side. On the other hand, when |R4+R3|/|R4−R3| is equal to or greater than the upper limit in Conditional Expression (3), this is not desirable because the Petzval sum becomes large, and thus, the image plane is tilted to the under side. Conditional Expression (3) also affects correction of the magnification chromatic aberration and correction of the axial chromatic aberration. When the value is equal to or less than the lower limit in Conditional Expression (3), the axial chromatic aberration and the magnification chromatic aberration both become large; on the other hand, when the value is equal to or greater than the upper limit thereof, the magnification chromatic aberration in particular becomes large.

With the thus-configured endoscope objective optical system 1 according to this embodiment, by setting the focal lengths of the individual lenses from the first lens L1 to the fourth lens L4 to appropriate values, it is possible to form a compact imaging optical system that provides a satisfactory image quality. Furthermore, by employing a high-pixel unit as the imaging device, high-definition images can be obtained at each object point.

In this embodiment, instead of Conditional Expressions (1) to (3), the following Conditional Expressions (1'), (2'), and (4) may be satisfied. By doing so, effects similar to those of the above-described endoscope objective optical system 1 can also be achieved.

$$1.39 < f31/f < 1.5 \tag{1'}$$

$$-2.52 < f32/f < -2.18 \tag{2'}$$

$$0.6 < g1/g2 < 1.08 \tag{4}$$

Here, g1 is the focal length of the first group G1 and g2 is the focal length of the second group G2.

Conditional Expression (4) is a conditional expression that relates to the power arrangement before and after the aperture stop S and balances the magnification chromatic aberration and the field curvature. In order to ensure an acceptable level of symmetry in the lens system before and after the aperture stop S, where the powers are positive on both sides, so that various types of aberration are not generated in a large amount, it is desirable that the difference between these powers be sufficiently small. Accordingly, the powers before and after the aperture stop S need to fall within the range of Conditional Expression (4). When the value is equal to or less than the lower limit in Conditional Expression (4), mainly the magnification chromatic aberration is exacerbated, causing the C line to be increasingly on the over side and the F line to be increasingly on the under side. On the other hand, when the value is equal to or greater than the upper limit in Conditional Expression (4), this is not desirable because the image plane is tilted to the under side.

It is even more desirable that the upper limit and the lower limit of Conditional Expression (4) be restricted as follows.

$$0.6 < g1/g2 < 1.05 \tag{4'}$$

$$0.73 < g1/g2 < 1.08 \tag{4''}$$

Within the ranges of Conditional Expression (4) restricted as in (4') and (4'') described above, it becomes even easier to correct the magnification chromatic aberration and the field curvature.

In this embodiment, in addition to satisfying Conditional Expression (4), it is desirable that the focal length of the first group G1 fall within the range of Conditional Expression (5) below.

$$2 < g1/f < 3.2 \tag{5}$$

In particular, although the magnification chromatic aberration is corrected by using Conditional Expression (4), if the power of the first group G1 is excessively high and g1/f becomes equal to or less than the lower limit in Conditional Expression (5), it becomes difficult to correct the magnification chromatic aberration even if the power arrangement of the second group G2 is adjusted so as to fall within the range of Conditional Expression (4). When g1/f is equal to or greater than the upper limit in Conditional Expression (5), the power of the first group G1 is decreased, resulting in an increase in the total length of the optical system.

Conditional Expression (5) may be restricted as follows.

$$2 < g1/f < 2.94 \tag{5'}$$

$$2.7 < g1/f < 3.2 \tag{5''}$$

By restricting the upper limit of Conditional Expression (5) as in Conditional Expression (5'), an even greater effect can be achieved in terms of size reduction. Furthermore, restricting the lower limit of Conditional Expression (5) as in Conditional Expression (5'') not only allows an even greater correction effect to be achieved on the magnification chromatic aberration, but is also effective in reducing the lens size in the first group G1.

In this embodiment, it is desirable that the second group G2 satisfy the following Conditional Expression (6) together with Conditional Expression (5).

$$2.9 < g2/f < 3.6 \tag{6}$$

When g2/f is equal to or less than the lower limit in Conditional Expression (6), the power of the second group G2 is increased, which makes it difficult to correct the field curvature even if the value falls within the range of Conditional Expression (4). Furthermore, because the back focus is decreased, it becomes impossible to ensure a sufficient focus adjusting space for determining the position of the imaging surface. Furthermore, because the ray height is increased at the final surface of the lenses, this results in an increase in the lens diameter, and thus, this is not desirable. On the other hand, when g2/f is equal to or greater than the upper limit in Conditional Expression (6), the back focus becomes excessively long if the power of the second group G2 is decreased, thus making it difficult to reduce the total length.

This embodiment may satisfy Conditional Expressions (7) and (8) that relate to the shape of the combined lens.

$$-1.2 < R5/R7 < -0.5 \tag{7}$$

$$-12.4 < R7/D7 < -8 \tag{8}$$

Here, R5 is the radius of curvature of the object-side surface of the third lens L3, R7 is the radius of curvature of the image-side surface of the fourth lens L4, and D7 is the thickness of the fourth lens L4 along the optical axis.

Conditional Expression (7) is mainly for correcting the field curvature. When R5/R7 is equal to or less than the lower limit in Conditional Expression (7) or when it is equal to or greater than the upper limit thereof, these conditions are not desirable because the image plane is tilted to the under side in both cases.

The upper limit of Conditional Expression (7) may be restricted as follows. Within the range of Conditional Expression (7'), it becomes even easier to correct the field curvature.

$$-1.2 < R5/R7 < -0.7 \quad (7')$$

When R7/D7 is equal to or less than the lower limit in Conditional Expression (8), because the thickness of the lens considerably differs between the center portion and the peripheral portion, this acts as a factor causing cracking or chipping of the lens. On the other hand, when R7/D7 is equal to or greater than the upper limit in Conditional Expression (8), this is not desirable because the thickness of the lens becomes thin at the center, which also reduces the strength thereof. Furthermore, this is also not desirable in terms of aberration correction, because the image plane is tilted to the under side, and the distortion also becomes large on the negative side.

It is desirable that the lower limit of Conditional Expression (8) be restricted as follows.

$$-11 < R7/D7 < -8 \quad (8')$$

In relation to Conditional Expression (7), it is desirable that the following Conditional Expressions (9) and (10) be satisfied.

$$2.7 < R5/f < 3.85 \quad (9)$$

$$-5.3 < R7/f < -3.2 \quad (10)$$

In addition to satisfying Conditional Expression (7), it is desirable that the radius of curvature of the object-side surface of the positive lens L3 of the combined lens L34 satisfy Conditional Expression (9). When R5/f is equal to or less than the lower limit in Conditional Expression (9), the curvature correction becomes difficult because the image plane is tilted to the under side, and when R5/f is equal to or greater than the upper limit thereof, the reduction of the total length is impeded.

In addition to satisfying Conditional Expression (7), it is desirable that the image-side surface of the negative lens L4 of the combined lens L34 satisfy Conditional Expression (10). When R7/f is equal to or less than the lower limit in Conditional Expression (10), it becomes difficult to correct the field curvature, and when the value is equal to or greater than the upper limit thereof, the astigmatism is increased; thus, these conditions are not desirable.

For Conditional Expressions (9) and (10), the lower limits and upper limits may be further restricted as follows.

$$2.7 < R5/f < 3 \quad (9')$$

$$3.11 < R5/f < 3.85 \quad (9'')$$

By restricting the lower limit of Conditional Expression (9) as in (9'), an even greater correction effect can be achieved on the field curvature. On the other hand, restricting the upper limit of Conditional Expression (9) as in (9'') makes it easier to reduce the total length.

$$-4.1 < R7/f < -3.2 \quad (10')$$

$$-5.3 < R7/f < -3.5 \quad (10'')$$

By restricting the lower limit of Conditional Expression (10) as in Conditional Expression (10'), it is possible to effectively correct the field curvature. On the other hand, by restricting the upper limit of Conditional Expression (10) as in Conditional Expression (10''), it is possible to correct the astigmatism even more effectively.

This embodiment may satisfy the following Conditional Expression (11). Conditional Expression (11) relates to Conditional Expression (8) and defines the thickness of the fourth lens L4.

$$0.3 < D7/f < 0.52 \quad (11)$$

When D7/f is equal to or less than the lower limit in Conditional Expression (11), this is not desirable because this results in a thin lens, which is cracked easily, and thus, this becomes a constraint on processing. On the other hand, when D7/f is equal to or greater than the upper limit thereof, this is not desirable because the ray height is increased at the rear surface of the lens, which results in an increase in the lens diameter.

Conditional Expression (11) may be restricted stepwise as follows. A more advantageous configuration is achieved in terms of processing when within the range of Conditional Expression (11'), and, in addition, in terms of processing and lens size reduction when within the range of Conditional Expression (11'').

$$0.32 < D7/f < 0.52 \quad (11')$$

$$0.36 < D7/f < 0.48 \quad (11'')$$

In this embodiment, it is desirable that the following Conditional Expression (12) be satisfied. Conditional Expression (12) defines the shape of the image-side surface of the second lens L2.

$$-2.22 < R4/f < -0.98 \quad (12)$$

Here, R4 is the radius of curvature of the image-side surface of second lens L2.

When R4/f is equal to or less than the lower limit in Conditional Expression (12), this is not desirable because the spherical aberration is over corrected on the over side, and, when it is equal to or greater than the upper limit thereof, this is not desirable because the spherical aberration is under corrected on the under side. Furthermore, outside the range of Conditional Expression (12), because the comatic aberration is greatly inclined, generating comatic flare, this results in a considerable deterioration of the image quality.

By restricting Conditional Expression (12) stepwise as follows, an even greater effect can be achieved.

$$-1.85 < R4/f < -1.22 \quad (12')$$

By restricting both the lower limit and the upper limit of Conditional Expression (12) as in Conditional Expression (12'), it becomes easy to correct the spherical aberration, and it is also possible to achieve even more satisfactory correction when correcting the comatic aberration.

Only the lower limit of Conditional Expression (12) may be restricted as in Conditional Expression (12'').

$$-1.76 < R4/f < -0.98 \quad (12'')$$

With this restriction, it is possible to achieve an even more satisfactory correction of the spherical aberration.

In this embodiment, it is desirable that the following Conditional Expression (13) be satisfied. Conditional Expression (13) defines the shape of the object-side surface of the second lens L2.

$$2.5 < R3/f < 9.2 \quad (13)$$

Here, R3 is the radius of curvature of the object-side surface of the second lens L2.

When R3/f is equal to or less than the lower limit in Conditional Expression (13), this is not desirable because the axial chromatic aberration and the magnification chromatic aberration are exacerbated, which act as factors causing color blurring. On the other hand, when R3/f is equal to or greater than the upper limit thereof, this is not desirable because the field curvature is affected, which causes the meridional image plane in particular to be inclined to the under side, thus increasing the astigmatic difference.

By restricting Conditional Expression (13) as follows, the effect thereof is further increased.

$$3 < R3/f < 6.2 \tag{13'}$$

In this embodiment, it is desirable that Conditional Expression (14) be satisfied.

$$-1.05 < f1/f < -0.65 \tag{14}$$

Here, f1 is the focal length of the first lens L1.

When f1/f is equal to or less than the lower limit in Conditional Expression (14), this is not desirable because the image plane is tilted to the under side, which also increases the C line-F line difference for the magnification chromatic aberration. Furthermore, because the distortion shifts to the positive side, it becomes difficult to ensure a sufficiently wide viewing angle. On the other hand, when f1/f is equal to or greater than the upper limit in Conditional Expression (14), this is not desirable because the image plane is greatly tilted to the over side.

In order to correct the field curvature, it is desirable that the upper limit of Conditional Expression (14) be restricted as follows.

$$-1.05 < f1/f < -0.8 \tag{14'}$$

Conditional Expression (15) relates to the power of the second lens L2.

$$1.25 < f2/f < 2.6 \tag{15}$$

Here, f2 is the focal length of the second lens L2. When f2/f is equal to or less than the lower limit in Conditional Expression (15), the error sensitivity with respect to the angle of view of the second lens L2 is increased, and this is not desirable because this acts as a factor causing viewing-field vignetting, in addition to requiring greater assembly precision. Furthermore, this is not desirable because correction of the axial chromatic aberration is also made difficult. On the other hand, when f2/f is equal to or greater than the upper limit in Conditional Expression (15), this is not desirable because the secondary spectrum is increased when correcting the axial chromatic aberration, which causes color blurring at the g line near the center of the viewing surface. This acts as a cause of the image quality deterioration because the occurrence thereof is increased, in particular, in the state in which a good focus is not achieved.

By restricting Conditional Expression (15) as follows, the effect thereof is further increased.

$$1.5 < f2/f < 2.6 \tag{15'}$$

$$1.25 < f2/f < 2 \tag{15''}$$

In Conditional Expression (15'), the lower limit of Conditional Expression (15) is restricted, thus further increasing the effect of reducing the error sensitivity. In Conditional Expression (15''), the upper limit of Conditional Expression (15) is restricted, which makes it possible to achieve further correction of the axial chromatic aberration.

This embodiment may satisfy the following Conditional Expression (16). Conditional Expression (16) is a conditional expression for the thickness of the second lens L2 along the optical axis and relates to correction of the field curvature.

$$1.25 < D3/f < 2.55 \tag{16}$$

Here, D3 is the thickness of the second lens L2 along the optical axis.

When D3/f is equal to or less than the lower limit in Conditional Expression (16), this is not desirable because the image plane is tilted to the negative side, and, when D3/f is equal to or greater than the upper limit thereof, this is not desirable because the image plane is tilted to the positive side. Under such circumstances, if inclinations or biases are generated due to the manufacturing error of the lens, the image quality is deteriorated because one side of the image plane easily falls out of the focusing position, which acts as a factor causing one-sided blurring.

Conditional Expression (16) may be restricted as follows.

$$1.35 < D3/f < 2.2 \tag{16'}$$

By restricting the upper limit and the lower limit as in Conditional Expression (16'), an even greater correction effect can be achieved on the field curvature.

This embodiment may satisfy the following Conditional Expression (17). Conditional Expression (17) defines the radius of curvature of the joining surface of the combined lens L34 and relates to the correction of the axial chromatic aberration and the magnification chromatic aberration.

$$-1.7 < R6/f < -1.0 \tag{17}$$

Here, R6 is the radius of curvature of the joining surface between the third lens L3 and the fourth lens L4.

When R6/f is equal to or less than the lower limit in Conditional Expression (17), the axial chromatic aberration and the magnification chromatic aberration both increase on the negative side at the C line and on the positive side at the F line. On the other hand, when the value is equal to or greater than the upper limit in Conditional Expression (17), the axial chromatic aberration and the magnification chromatic aberration both are individually increased on the positive side at the C line and on the negative side at the F line, and this is not desirable because large color blurring is generated from the center of the viewing surface to the periphery thereof, thus deteriorating the image.

The lower limit of Conditional Expression (17) may be restricted as follows.

$$-1.5 < R6/f < -1.0 \tag{17'}$$

By modifying the condition as in Conditional Expression (17'), it is possible to achieve an even more satisfactory correction of the chromatic aberration at the C line-F line.

This embodiment may satisfy the following Conditional Expression (18). Conditional Expression (18) relates to the radius of curvature of the image-side surface of the first lens L1.

$$0.55 < R2/f < 0.95 \tag{18}$$

Here, R2 is the radius of curvature of the image-side surface of the first lens L1.

With Conditional Expression (18), the distortion is corrected so that an appropriate angle of view can be maintained.

When R2/f is equal to or less than the lower limit in Conditional Expression (18), this is not desirable because not only is the angle of view increased, but also the distortion at the peripheral portion becomes excessively large due to an excessive distortion on the negative side. On the other hand, when R2/f is equal to or greater than the upper limit in Conditional Expression (18), the absolute value of the distortion is decreased, causing the objective optical system to have a narrow viewing angle unless the focal length of the entire system is decreased, and thus, this makes the system unsuitable for an endoscope objective optical system where an optical system having a certain degree of wide viewing angle is required. Conditional Expression (18) also affects the correction of the comatic aberration. When R2/f is equal to or less than the lower limit in Conditional Expression (18), this is not desirable because the comatic aberration is inclined to the negative side. On the other hand, when R2/f is equal to or greater than the upper limit thereof, this is not desirable because the comatic aberration is inclined to the positive side, acting as a factor causing comatic flare.

Furthermore, the lower limit of Conditional Expression (18) should be restricted as follows. If the value falls within the range of Conditional Expression (18'), an even greater correction effect is achieved both on the distortion and the comatic aberration.

$$0.75 < R2/f < 0.95 \quad (18')$$

This embodiment may satisfy the following Conditional Expression (19). Conditional Expression (19) defines the thickness of the first lens L1.

$$0.29 < D1/f < 0.5 \quad (19)$$

Here, D1 is the thickness of the first lens L1 along the optical axis.

When D1/f is equal to or less than the lower limit in Conditional Expression (19), the strength of the lens is affected because the concave lens becomes thin at the center portion, and when D1/f is equal to or greater than the upper limit thereof, the ray height is increased by an amount corresponding to the increase in the thickness of the lens, which results in an increase in the lens diameter.

Furthermore, the range of Conditional Expression (19) may be restricted as follows.

$$0.3 < D1/f < 0.42 \quad (19')$$

By imposing restrictions as described above, an even greater effect is achieved.

This embodiment may satisfy the following Conditional Expression (20). Conditional Expression (20) defines the air-equivalent distance between the image-side surface of the first lens L1 and the object-side surface of the second lens L2.

$$0.24 < D2/f < 1.5 \quad (20)$$

Here, D2 is the air-equivalent length along the optical axis between the image-side surface of the first lens L1 and object-side surface of the second lens L2.

Conditional Expression (20) contributes to the correction of the axial chromatic aberration and the field curvature. When D2/f is equal to or less than the lower limit in Conditional Expression (20), it becomes difficult to correct the secondary spectrum, generating a large effect at the g line on the positive side, which acts as a factor causing deterioration of the resolution at the center of the viewing surface. Furthermore, this is not desirable because the image plane is tilted to the under side. On the other hand, when D2/f is equal to or greater than the upper limit in Conditional Expression (20), a large axial chromatic aberration is generated at the C line on the positive side and a large axial chromatic aberration is generated at the F line on the negative side, which also result in deterioration of the resolving power at the center of the viewing surface. Furthermore, this is not desirable because the image plane is tilted to the over side.

By restricting the lower limit and the upper limit of Conditional Expression (20) as follows, respectively, the axial chromatic aberration and the field curvature can be corrected even more effectively.

$$0.24 < D2/f < 0.68 \quad (20')$$

$$0.4 < D2/f < 1.5 \quad (20'')$$

This embodiment may satisfy the following Conditional Expression (21). Conditional Expression (21) relates to the distance from the image-side surface of the second lens L2 to the aperture stop S and is for suppressing fluctuations of the meridional image plane.

$$0 < D4/f < 0.2 \quad (21)$$

Here, D46 is the distance along the optical axis between the image-side surface of the second lens L2 and the aperture stop S.

When D4/f is equal to or less than the lower limit in Conditional Expression (21), this is not desirable because the meridional image plane is inclined to the under side, and when D4/f is equal to or greater than the upper limit thereof, this is not desirable because the image plane is inclined to the over side, which increases the inclination of a higher-order image plane in particular.

This embodiment may satisfy the following Conditional Expression (22). Conditional Expression (22) is a conditional expression that relates to the air-equivalent distance from the aperture stop S to the object-side surface of the third lens L3.

$$0.18 < D5/f < 1.56 \quad (22)$$

Here, D5 is the distance along the optical axis between the aperture stop S and the object-side surface of the third lens L3.

As with Conditional Expression (21), this Conditional Expression (22) relates to correction of the field curvature, in particular, the meridional image plane. When D5/f is equal to or less than the lower limit in Conditional Expression (22), this is not desirable because the image plane is inclined to the under side, and, when D5/f is equal to or greater than the upper limit thereof, this is not desirable because the image plane is inclined to the over side.

In some cases, a filter for color reproduction such as an infrared cut filter or the like, a filter for cutting a laser beam used during treatment, or the like is disposed between the aperture stop S and object-side surface of the third lens L3. In such a case, the lower limit of Conditional Expression (22) may be restricted as follows.

$$0.48 < D5/f < 1.56 \quad (22')$$

When D5/f is equal to or less than the lower limit in Conditional Expression (22'), this is not desirable because the space for the filter becomes insufficient.

Furthermore, for correction of the field curvature, the upper limit of Conditional Expression (22) may be restricted as follows.

$$0.18 < D5/f < 1.21 \quad (22'')$$

This embodiment may satisfy the following Conditional Expression (23). Conditional Expression (23) relates to the thickness of the third lens L3 along the optical axis.

$$0.85 < D6/f < 2 \quad (23)$$

Here, D6 is the thickness of the third lens L3 along the optical axis.

When D6/f is equal to or less than the lower limit in Conditional Expression (23), this is not desirable because it becomes difficult to ensure a sufficiently large rim for the lens, which creates a problem in terms of the ease of processing, and, when D6/f is equal to or greater than the upper limit thereof, this is not desirable because the difference between the C line and the F line increases for the axial chromatic aberration.

Furthermore, Conditional Expression (23) may be restricted as follows. Within the range of Conditional Expression (23'), the effect of Conditional Expression (23) is increased even further.

$$0.95 < D6/f < 1.45 \quad (23')$$

This embodiment may satisfy the following Conditional Expression (24). It is desirable to make the viewing angle as wide as possible in order to reduce the risk of overlooking a lesion site when screening a biological subject, and, minimally, a viewing angle of 124° is required. For a wide-angle viewing field, it is desirable that half angle of view, that is, the viewing-field range, satisfy at least the following Conditional Expression (24).

$$\omega > 62 \quad (24)$$

Here, ω is the half angle of view.

Furthermore, it is desirable that the range of Conditional Expression (24) be restricted as follows so that the viewing-field range is equal to or greater than 130°.

$$\omega > 65 \quad (24')$$

With regard to finding a lesion, it is more desirable that the half angle of view be restricted as follows.

$$\omega > 75 \quad (24'')$$

With this embodiment, it is desirable that the following Conditional Expressions (25) and (26) be satisfied in order to achieve a reduction in size.

$$rh1/IH < 1.25 \quad (25)$$

Here, rh1 is the maximum ray height at the object-side surface of the first lens L1, and IH is the image height.

Conditional Expression (25) relates to the outer diameter of the first lens L1. The outer diameter of the first lens L1 is increased when outside the range of Conditional Expression (25), and this is not desirable because this not only makes it difficult to arrange an illumination system, a forceps channel, and so forth, but also becomes a cause of an increase in the outer diameter itself of the endoscope.

$$LT/f < 9.5 \quad (26)$$

Here, LT is the total length of the lens (the distance from object-side surface of the first lens L1 to the image plane).

Conditional Expression (26) relates to the total length of the optical system. The total length of the lens and the length of a rigid portion at the distal end of the endoscope are increased when outside the range of Conditional Expression (26), and this is not desirable because the effect of reducing the burden on a patient is decreased.

Furthermore, by restricting Conditional Expression (26) as follows, an additional size reduction can be expected.

$$LT/f < 8.5 \quad (26')$$

EXAMPLES

Next, Examples 1 to 11 of the endoscope objective optical system according to the above-described embodiment will be described below with reference to FIGS. 2 to 23. In lens data described for the individual Examples, r is the radius of curvature (unit: mm), d is the distance between surfaces (unit: mm), Ne is the refractive index with respect to the e line, and Vd is the Abbe number with respect to the d line. In diagrams of aberration curves to be referred to, (a), (b), and (d) show the spherical aberration, the distortion, and the magnification chromatic aberration, respectively, for the e line (546.07 nm), the g line (435.84 nm), the F line (486.13 nm), and the C line (656.27 nm), and (b) shows the astigmatism for the meridional image plane (meridional image surface) and the sagittal image plane (sagittal image surface).

Example 1

Figure 2:
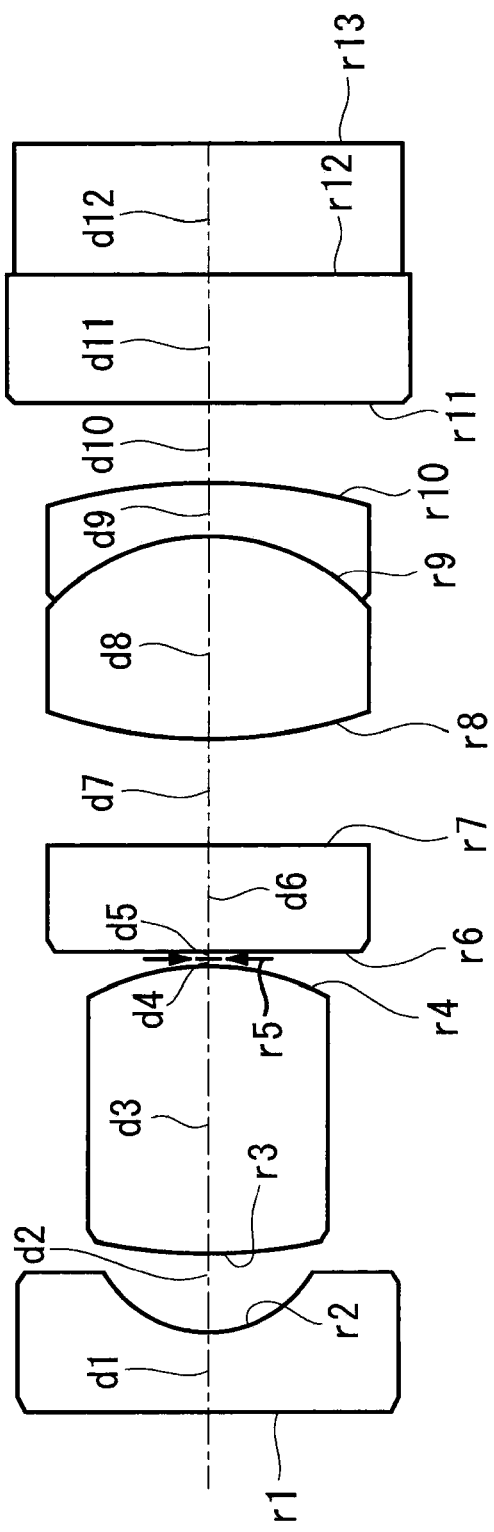
FIG. 2 is a cross-sectional view of lenses showing the overall configuration of an endoscope objective optical system according to Example 1 of the present invention.
Figure 3:
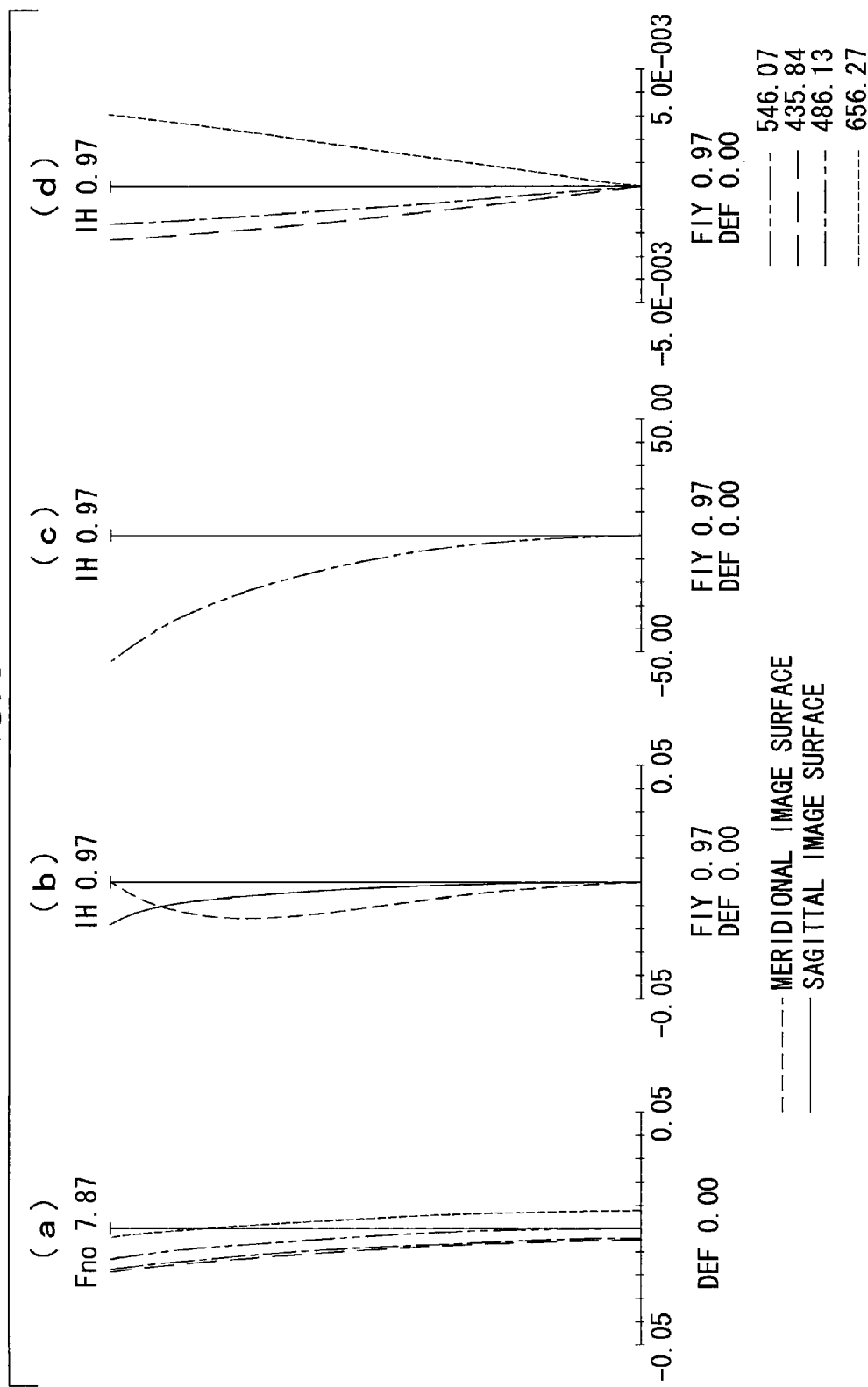
FIG. 3 is a diagram showing aberration curves for the endoscope objective optical system in FIG. 2, for (a) spherical aberration, (b) astigmatism, (c) distortion, and (d) magnification chromatic aberration.

For an endoscope objective optical system according to Example 1 of the present invention, the configuration thereof is shown in FIG. 2, and the lens data and values of various paraxial quantities are shown below. FIG. 3 shows a diagram of the aberration curves for the endoscope objective optical system according to this Example.

| Lens data | | | | |
|---|---|---|---|---|
| Surface number | r | d | Ne | Vd |
| 1 | ∞ | 0.43 | 1.88815 | 40.76 |
| 2 | 0.700 | 0.49 | | |
| 3 | 3.769 | 1.64 | 1.75844 | 52.32 |
| 4 | −1.363 | 0.04 | | |
| 5 | Aperture stop | 0.03 | | |
| 6 | ∞ | 0.64 | 1.52300 | 66.50 |
| 7 | ∞ | 0.61 | | |
| 8 | 3.643 | 1.15 | 1.73234 | 54.68 |
| 9 | −1.294 | 0.32 | 1.93429 | 18.90 |
| 10 | −3.369 | 0.43 | | |
| 11 | ∞ | 0.75 | 1.51825 | 64.14 |
| 12 | ∞ | 0.75 | 1.61350 | 50.50 |
| 13 | Imaging surface | | | |

| Miscellaneous data | |
|---|---|
| Focal length | 1.00 |
| Fno | 7.87 |
| Distance to object point | 9.0 |
| Image height | 0.97 |

Example 2

Figure 4:
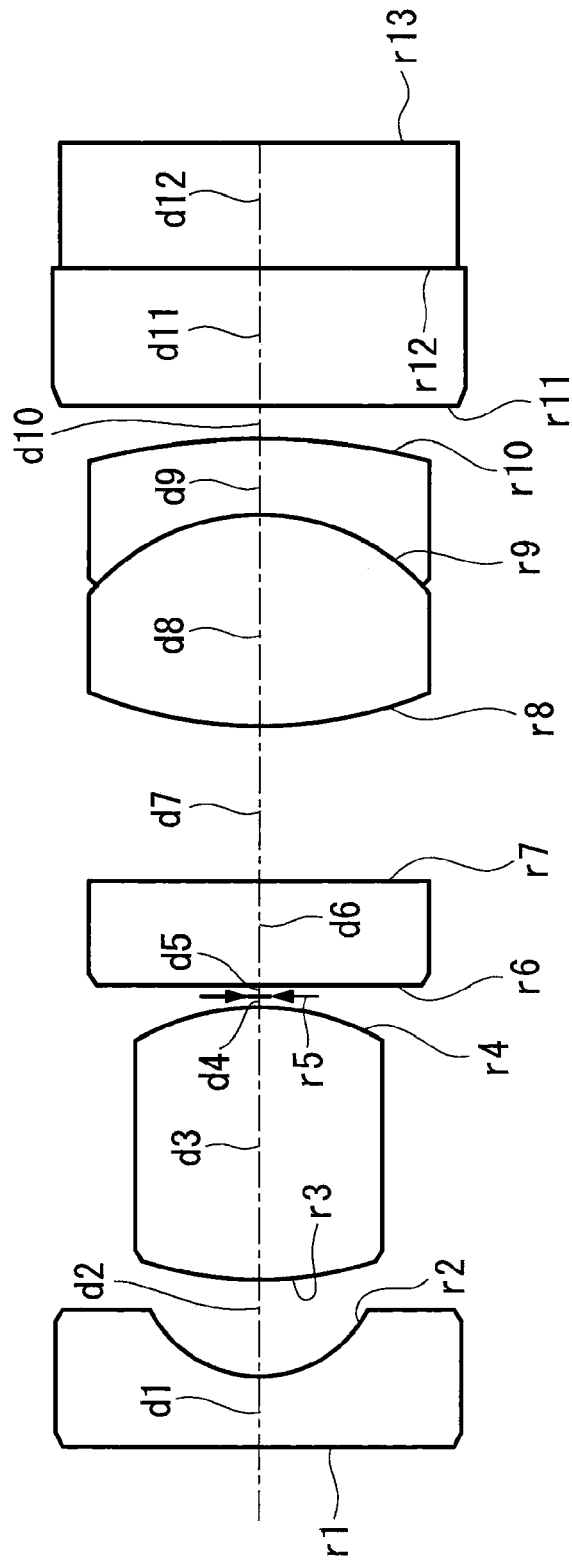
FIG. 4 is a cross-sectional view of lenses showing the overall configuration of an endoscope objective optical system according to Example 2 of the present invention.
Figure 5:
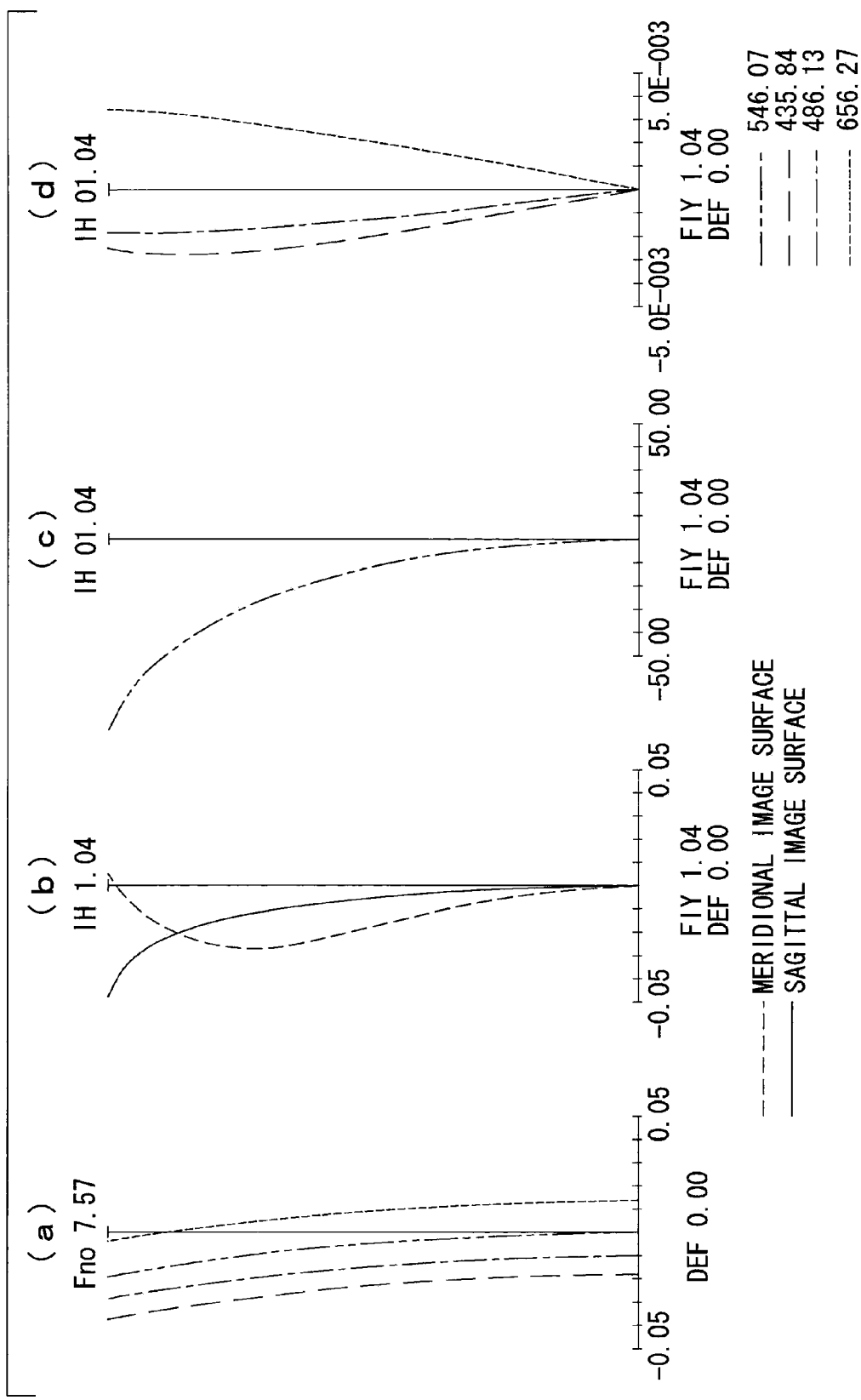
FIG. 5 is a diagram showing aberration curves for the endoscope objective optical system in FIG. 4, for (a) spherical aberration, (b) astigmatism, (c) distortion, and (d) magnification chromatic aberration.

For an endoscope objective optical system according to Example 2 of the present invention, the configuration thereof is shown in FIG. 4, and the lens data and values of various paraxial quantities are shown below. FIG. 5 shows a diagram of the aberration curves for the endoscope objective optical system according to this Example.

| Lens data | | | | |
|---|---|---|---|---|
| Surface number | r | d | Ne | Vd |
| 1 | ∞ | 0.42 | 1.88815 | 40.76 |
| 2 | 0.725 | 0.60 | | |
| 3 | 4.242 | 1.62 | 1.72341 | 50.23 |
| 4 | −1.352 | 0.04 | | |
| 5 | Aperture stop | 0.03 | | |
| 6 | ∞ | 0.68 | 1.52300 | 66.50 |
| 7 | ∞ | 0.89 | | |
| 8 | 3.245 | 1.23 | 1.74435 | 52.64 |
| 9 | −1.410 | 0.48 | 1.93429 | 18.90 |
| 10 | −3.977 | 0.18 | | |
| 11 | ∞ | 0.80 | 1.51825 | 64.14 |
| 12 | ∞ | 0.80 | 1.51825 | 64.14 |
| 13 | Imaging surface | | | |

| Miscellaneous data | |
|---|---|
| Focal length | 1.00 |
| Fno | 7.57 |
| Distance to object point | 8.2 |
| Image height | 1.04 |

Example 3

Figure 6:
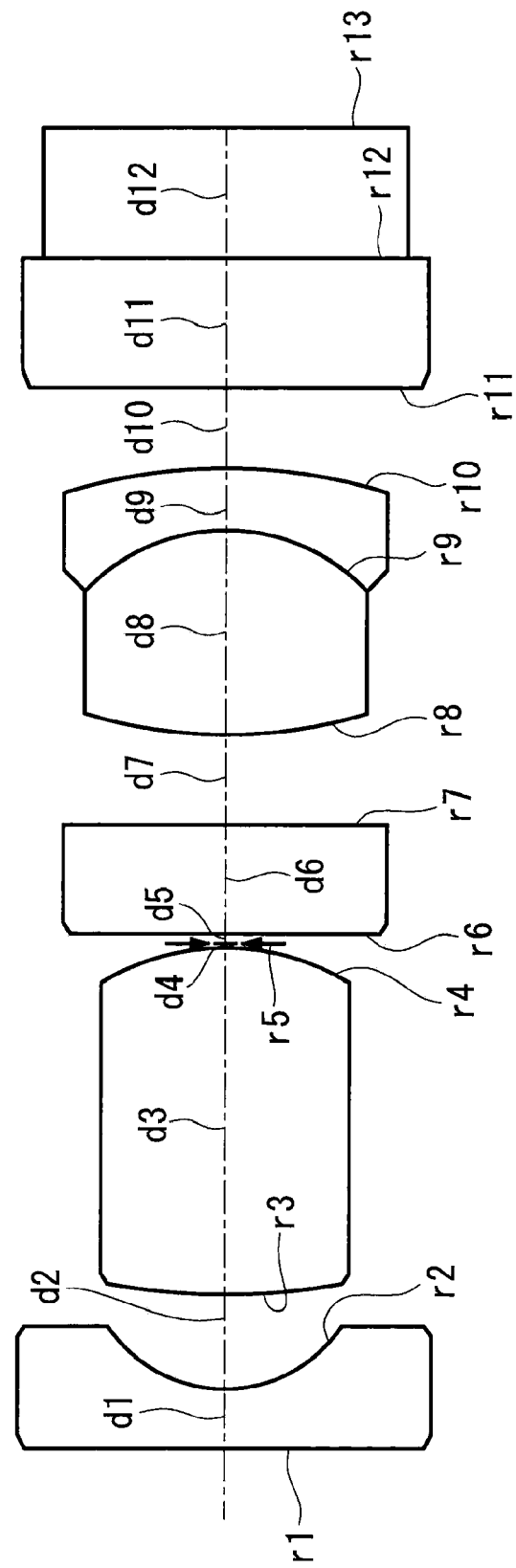
FIG. 6 is a cross-sectional view of lenses showing the overall configuration of an endoscope objective optical system according to Example 3 of the present invention.
Figure 7:
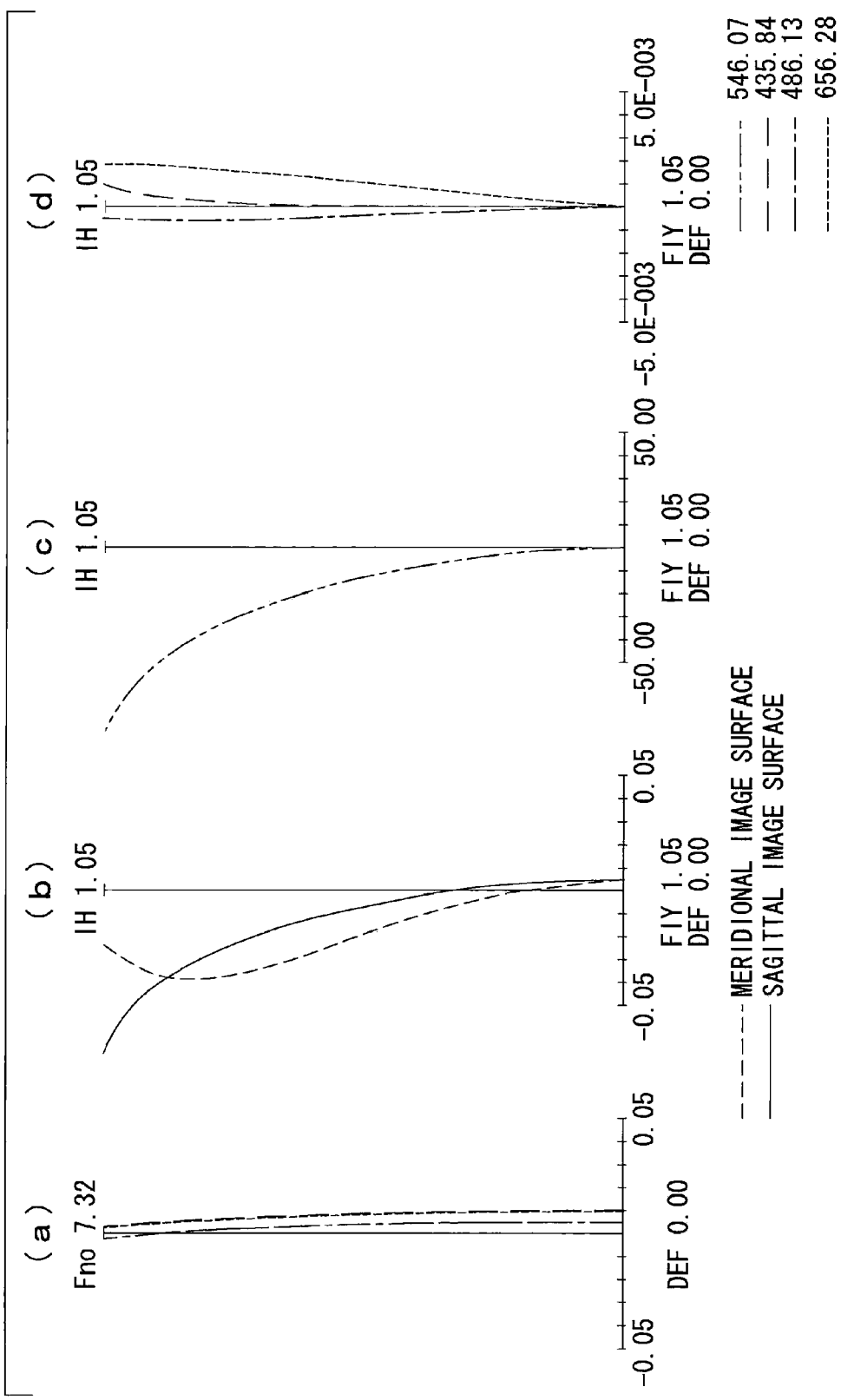
FIG. 7 is a diagram showing aberration curves for the endoscope objective optical system in FIG. 6, for (a) spherical aberration, (b) astigmatism, (c) distortion, and (d) magnification chromatic aberration.

For an endoscope objective optical system according to Example 3 of the present invention, the configuration thereof is shown in FIG. 6, and the lens data and values of various paraxial quantities are shown below. FIG. 7 shows a diagram of the aberration curves for the endoscope objective optical system according to this Example.

Example 4

Figure 8:
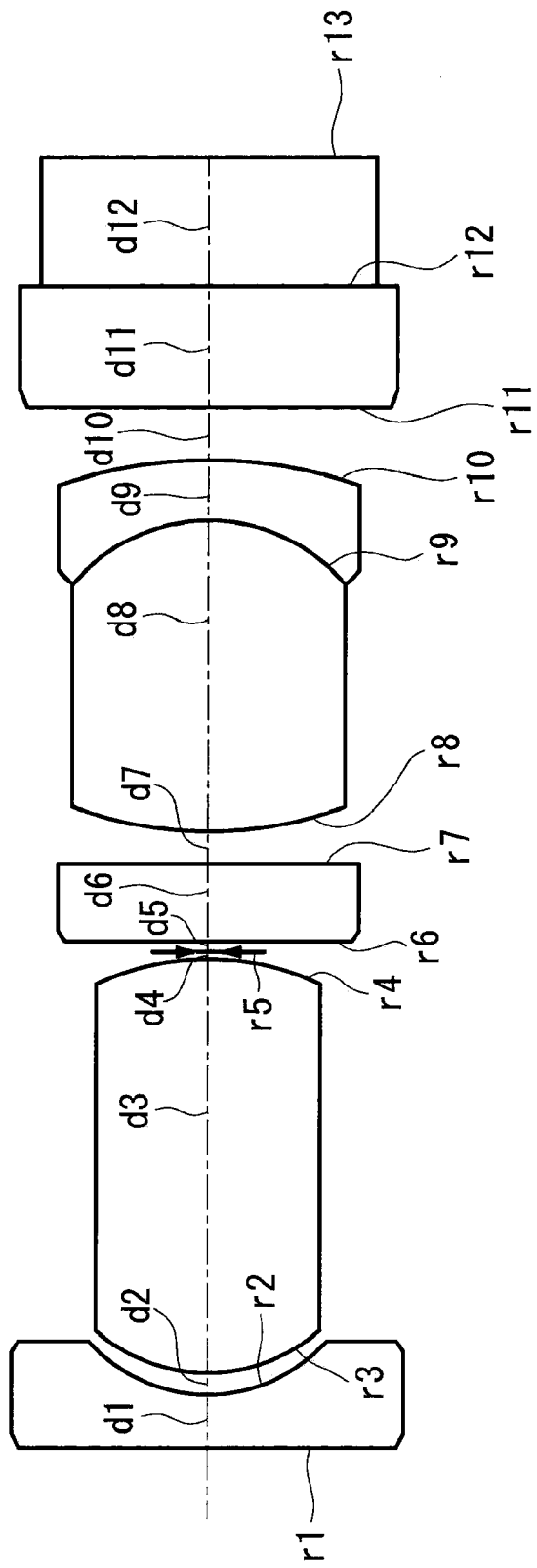
FIG. 8 is a cross-sectional view of lenses showing the overall configuration of an endoscope objective optical system according to Example 4 of the present invention.
Figure 9:
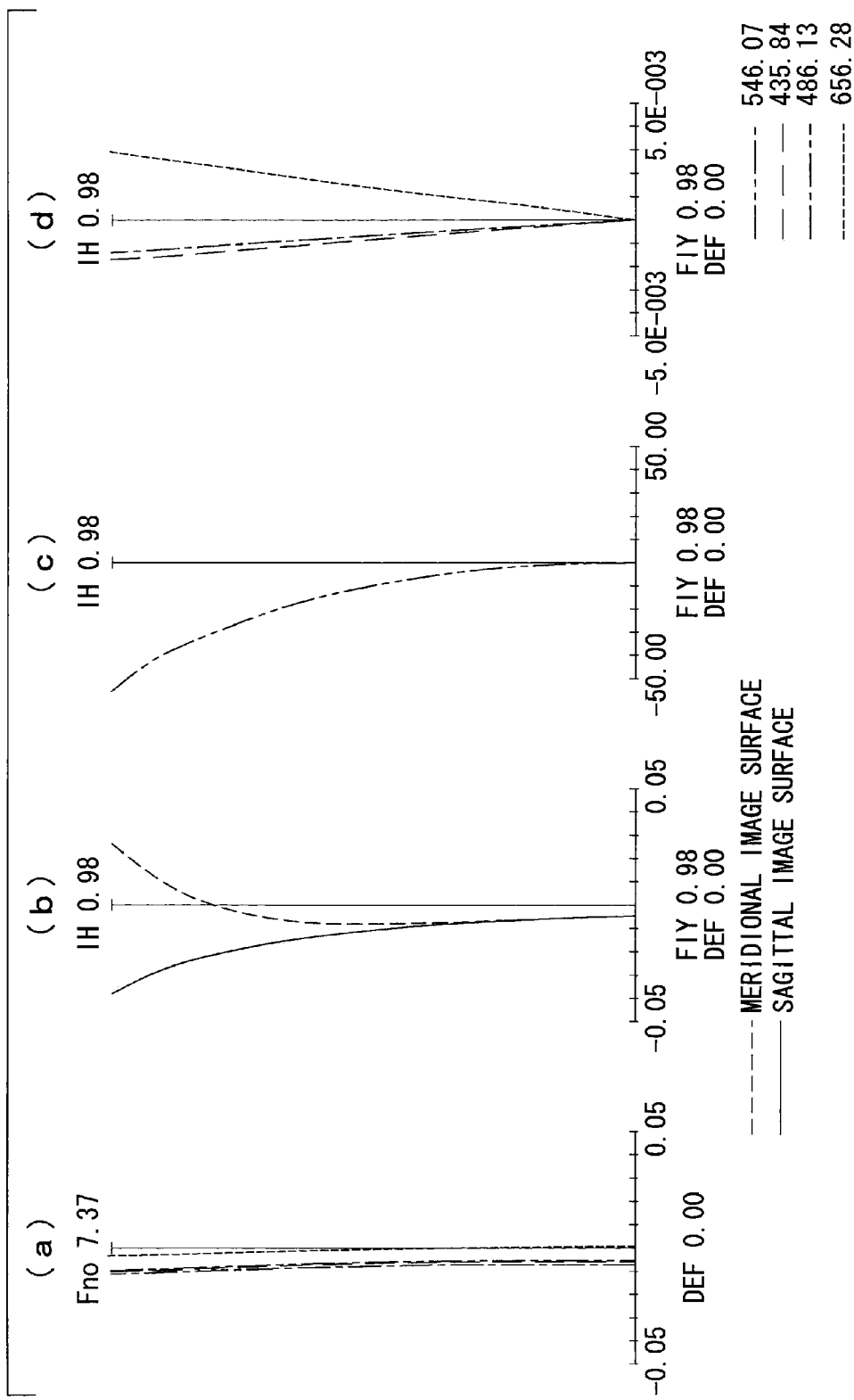
FIG. 9 is a diagram showing aberration curves for the endoscope objective optical system in FIG. 8, for (a) spherical aberration, (b) astigmatism, (c) distortion, and (d) magnification chromatic aberration.

For an endoscope objective optical system according to Example 4 of the present invention, the configuration thereof is shown in FIG. 8, and the lens data and values of various paraxial quantities are shown below. FIG. 9 shows a diagram of the aberration curves for the endoscope objective optical system according to this Example.

| Lens data | | | | |
|---|---|---|---|---|
| Surface number | r | d | Ne | Vd |
| 1 | ∞ | 0.35 | 1.88815 | 40.76 |
| 2 | 0.882 | 0.61 | | |
| 3 | 5.552 | 2.17 | 1.77621 | 49.60 |
| 4 | −1.749 | 0.03 | | |
| 5 | Aperture stop | 0.03 | | |
| 6 | ∞ | 0.70 | 1.52300 | 66.30 |
| 7 | ∞ | 0.58 | | |
| 8 | 3.118 | 1.30 | 1.73234 | 54.68 |
| 9 | −1.227 | 0.36 | 1.93429 | 18.90 |
| 10 | −3.462 | 0.50 | | |
| 11 | ∞ | 0.80 | 1.51825 | 64.14 |
| 12 | ∞ | 0.80 | 1.61350 | 50.50 |
| 13 | Imaging surface | | | |

| Miscellaneous data | |
|---|---|
| Focal length | 1.00 |
| Fno | 7.32 |
| Distance to object point | 7.8 |
| Image height | 1.05 |

Example 5

Figure 10:
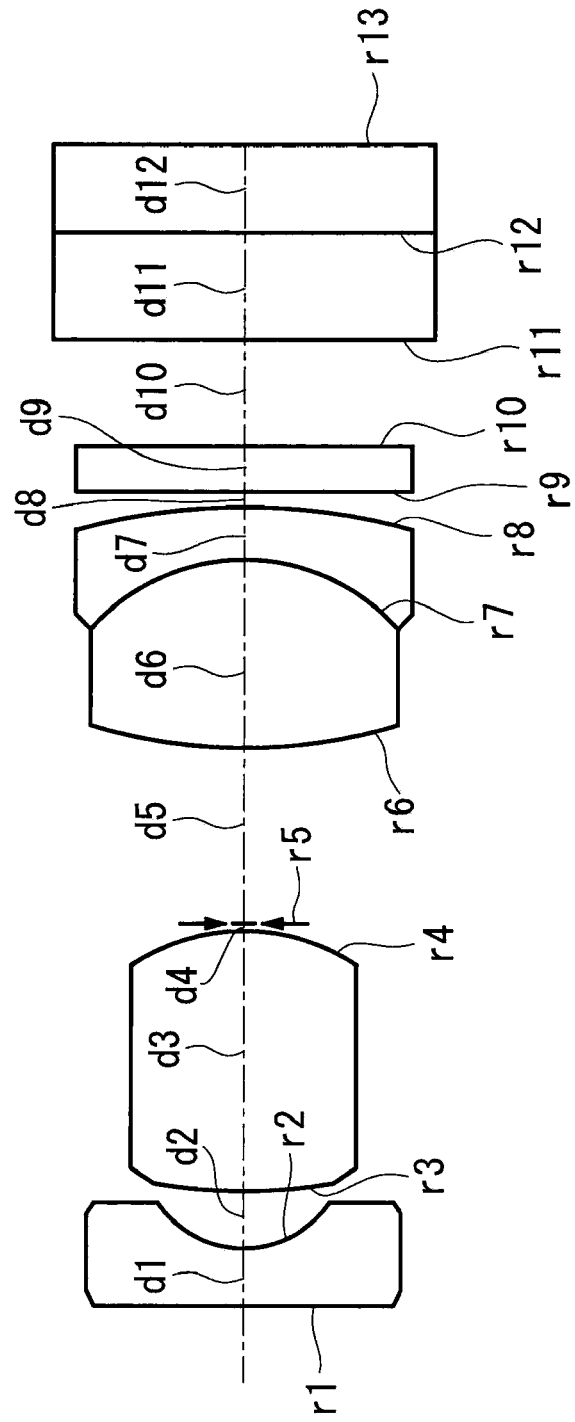
FIG. 10 is a cross-sectional view of lenses showing the overall configuration of an endoscope objective optical system according to Example 5 of the present invention.
Figure 11:
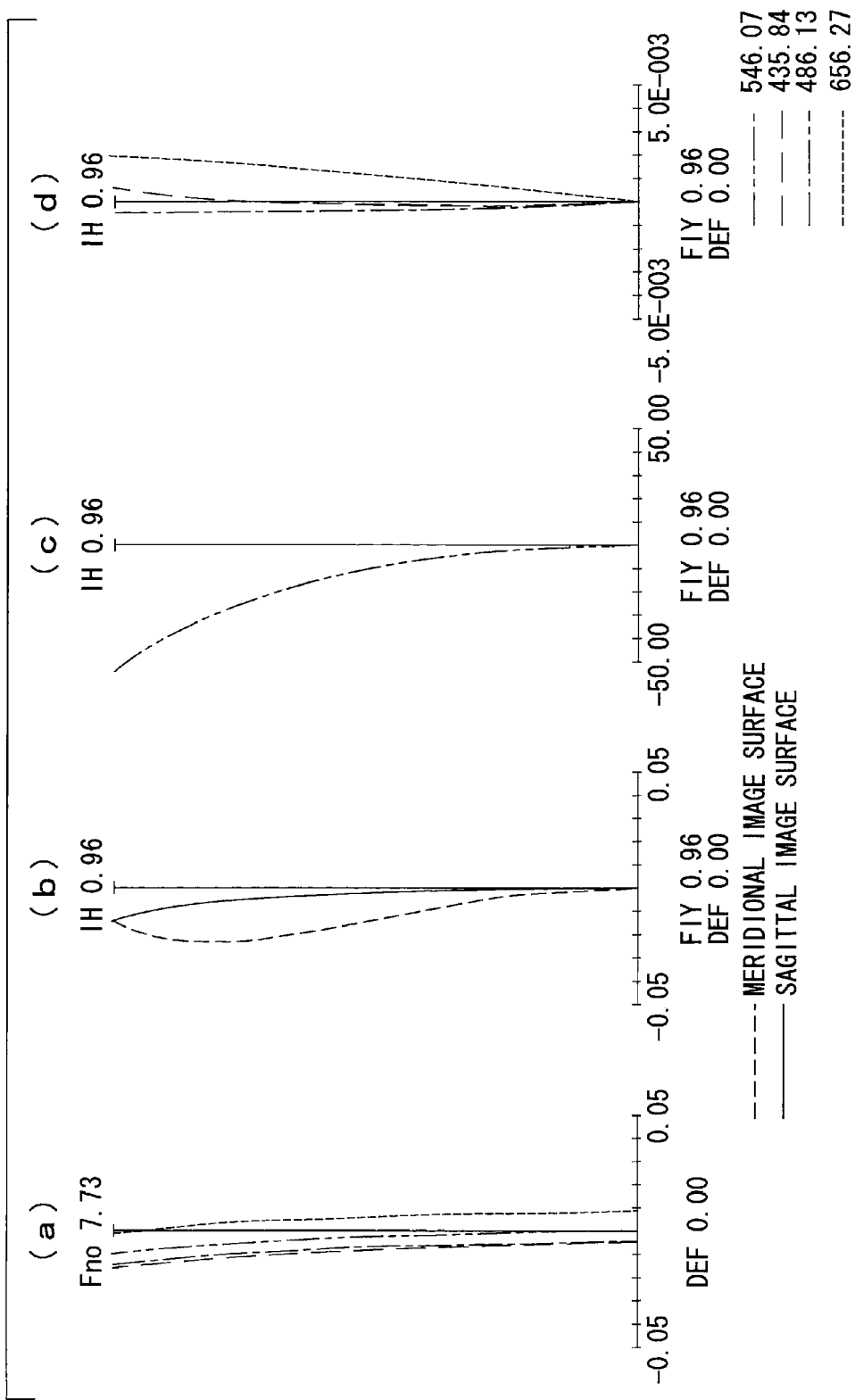
FIG. 11 is a diagram showing aberration curves for the endoscope objective optical system in FIG. 10, for (a) spherical aberration, (b) astigmatism, (c) distortion, and (d) magnification chromatic aberration.

For an endoscope objective optical system according to Example 5 of the present invention, the configuration thereof is shown in FIG. 10, and the lens data and values of various paraxial quantities are shown below. In this Example, the flat-parallel plate is disposed on the rear side of the second group. FIG. 11 shows a diagram of the aberration curves for the endoscope objective optical system according to this Example.

| Lens data | | | | |
|---|---|---|---|---|
| Surface number | r | d | Ne | Vd |
| 1 | ∞ | 0.33 | 1.88815 | 40.76 |
| 2 | 0.821 | 0.27 | | |
| 3 | 4.006 | 2.43 | 1.77621 | 49.60 |
| 4 | −1.606 | 0.03 | | |
| 5 | Aperture stop | 0.07 | | |
| 6 | ∞ | 0.47 | 1.52300 | 66.30 |
| 7 | ∞ | 0.20 | | |
| 8 | 3.365 | 1.89 | 1.77621 | 49.60 |
| 9 | −1.132 | 0.38 | 1.93429 | 18.90 |
| 10 | −3.351 | 0.32 | | |
| 11 | ∞ | 0.75 | 1.51825 | 64.14 |
| 12 | ∞ | 0.80 | 1.61350 | 50.50 |
| 13 | Imaging surface | | | |

| Miscellaneous data | |
|---|---|
| Focal length | 1.00 |
| Fno | 7.37 |
| Distance to object point | 7.3 |
| Image height | 0.98 |

Example 6

Figure 12:
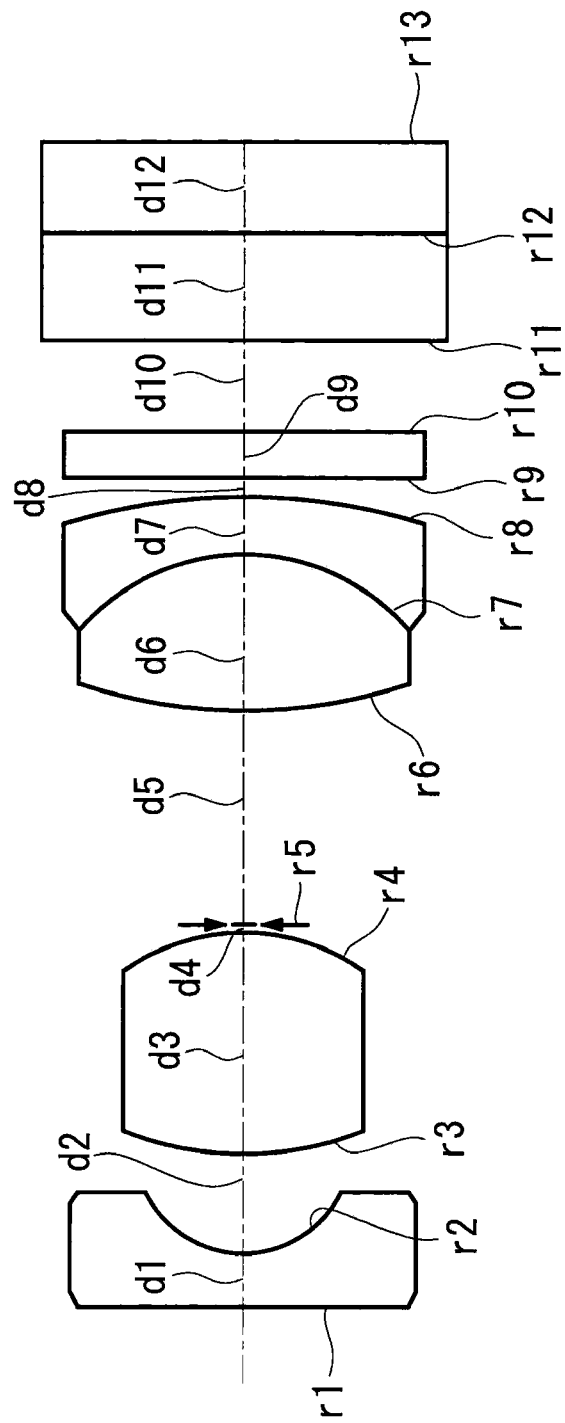
FIG. 12 is a cross-sectional view of lenses showing the overall configuration of an endoscope objective optical system according to Example 6 of the present invention.
Figure 13:
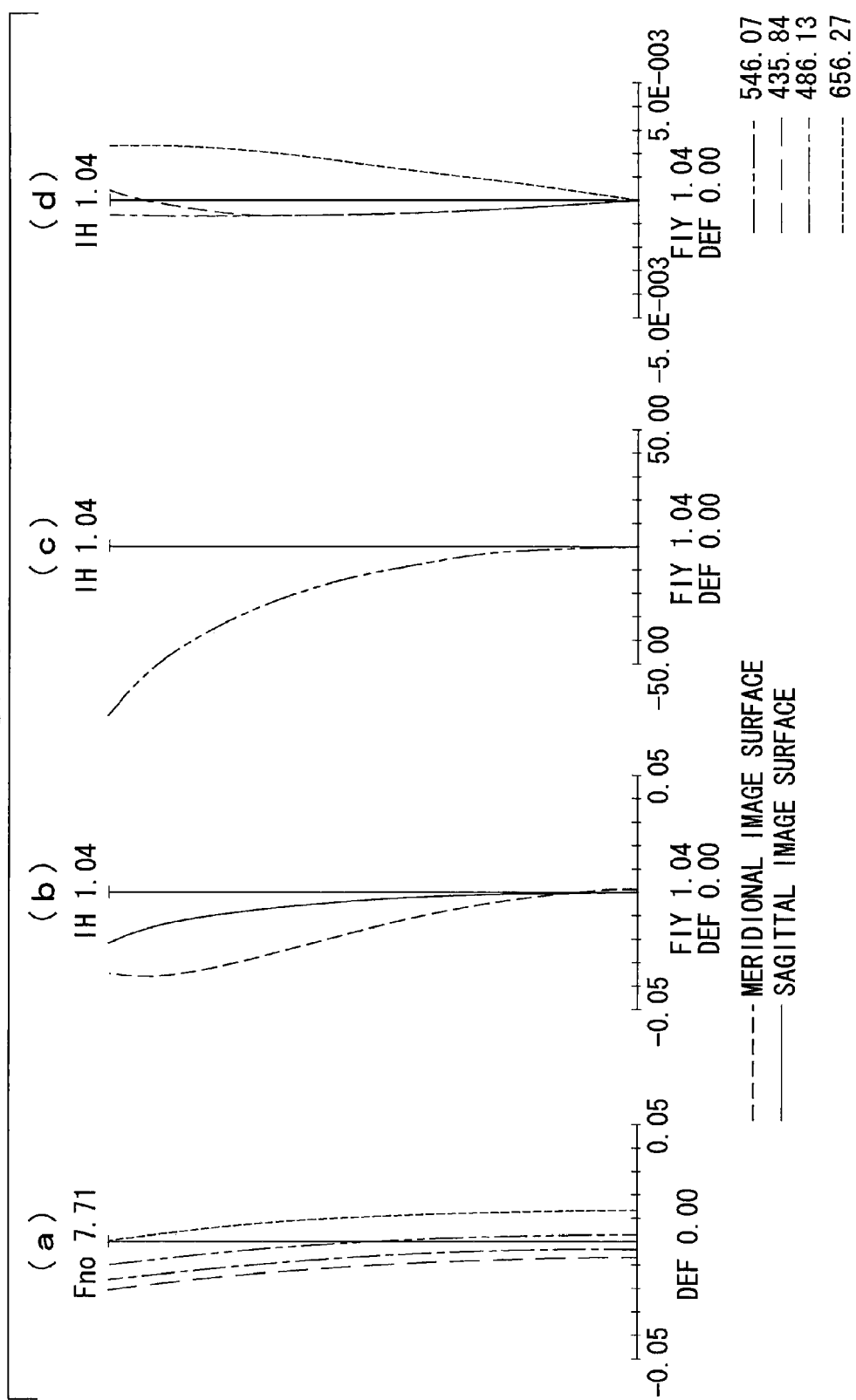
FIG. 13 is a diagram showing aberration curves for the endoscope objective optical system in FIG. 12, for (a) spherical aberration, (b) astigmatism, (c) distortion, and (d) magnification chromatic aberration.

For an endoscope objective optical system according to Example 6 of the present invention, the configuration thereof is shown in FIG. 12, and the lens data and values of various paraxial quantities are shown below. In this Example, the flat-parallel plate is disposed on the rear side of the second group. FIG. 13 shows a diagram of the aberration curves for the endoscope objective optical system according to this Example.

| Lens data | | | | |
|---|---|---|---|---|
| Surface number | r | d | Ne | Vd |
| 1 | ∞ | 0.32 | 1.88815 | 40.76 |
| 2 | 0.626 | 0.36 | | |
| 3 | 3.206 | 1.46 | 1.67340 | 47.23 |
| 4 | −1.154 | 0.05 | | |
| 5 | Aperture stop | 1.00 | | |
| 6 | 3.189 | 1.08 | 1.73234 | 54.68 |
| 7 | −1.228 | 0.32 | 1.93429 | 18.90 |
| 8 | −3.218 | 0.09 | | |
| 9 | ∞ | 0.25 | 1.51500 | 75.00 |
| 10 | ∞ | 0.62 | | |
| 11 | ∞ | 0.60 | 1.51825 | 64.14 |
| 12 | ∞ | 0.50 | 1.51825 | 64.14 |
| 13 | Imaging surface | | | |

| Miscellaneous data | |
|---|---|
| Focal length | 1.00 |
| Fno | 7.73 |
| Distance to object point | 10.5 |
| Image height | 0.96 |

Example 7

Figure 14:
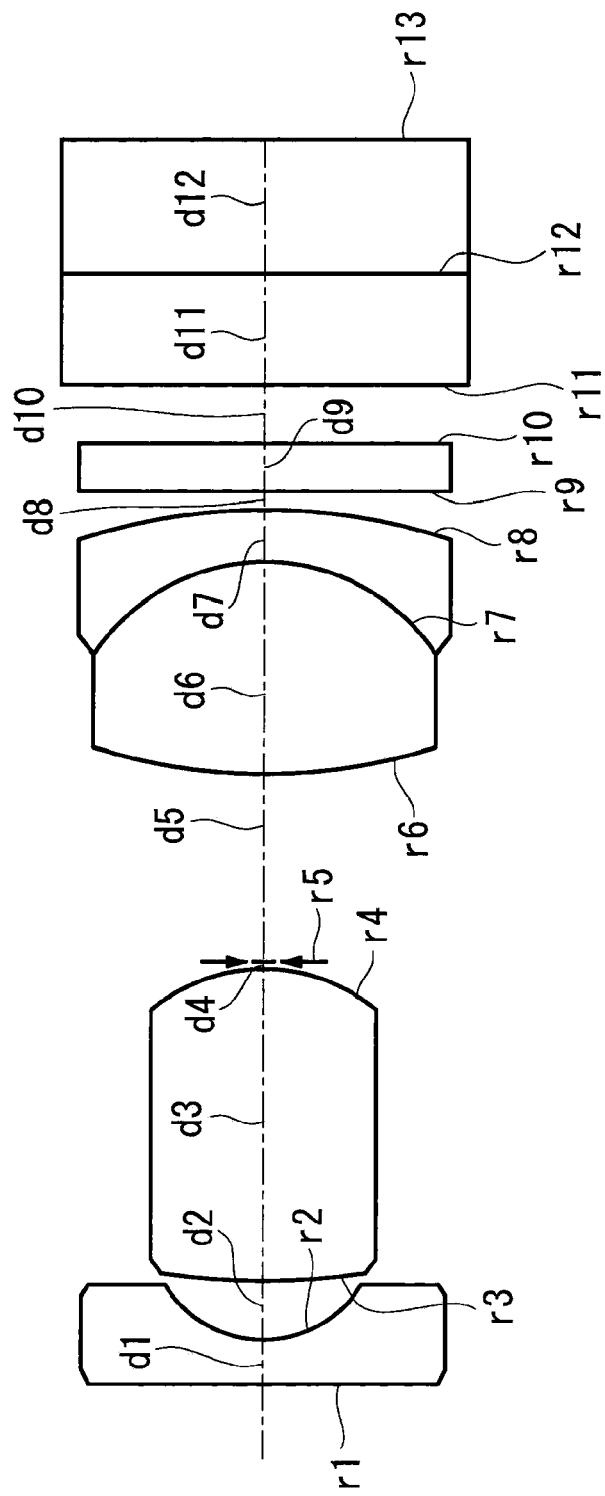
FIG. 14 is a cross-sectional view of lenses showing the overall configuration of an endoscope objective optical system according to Example 7 of the present invention.
Figure 15:
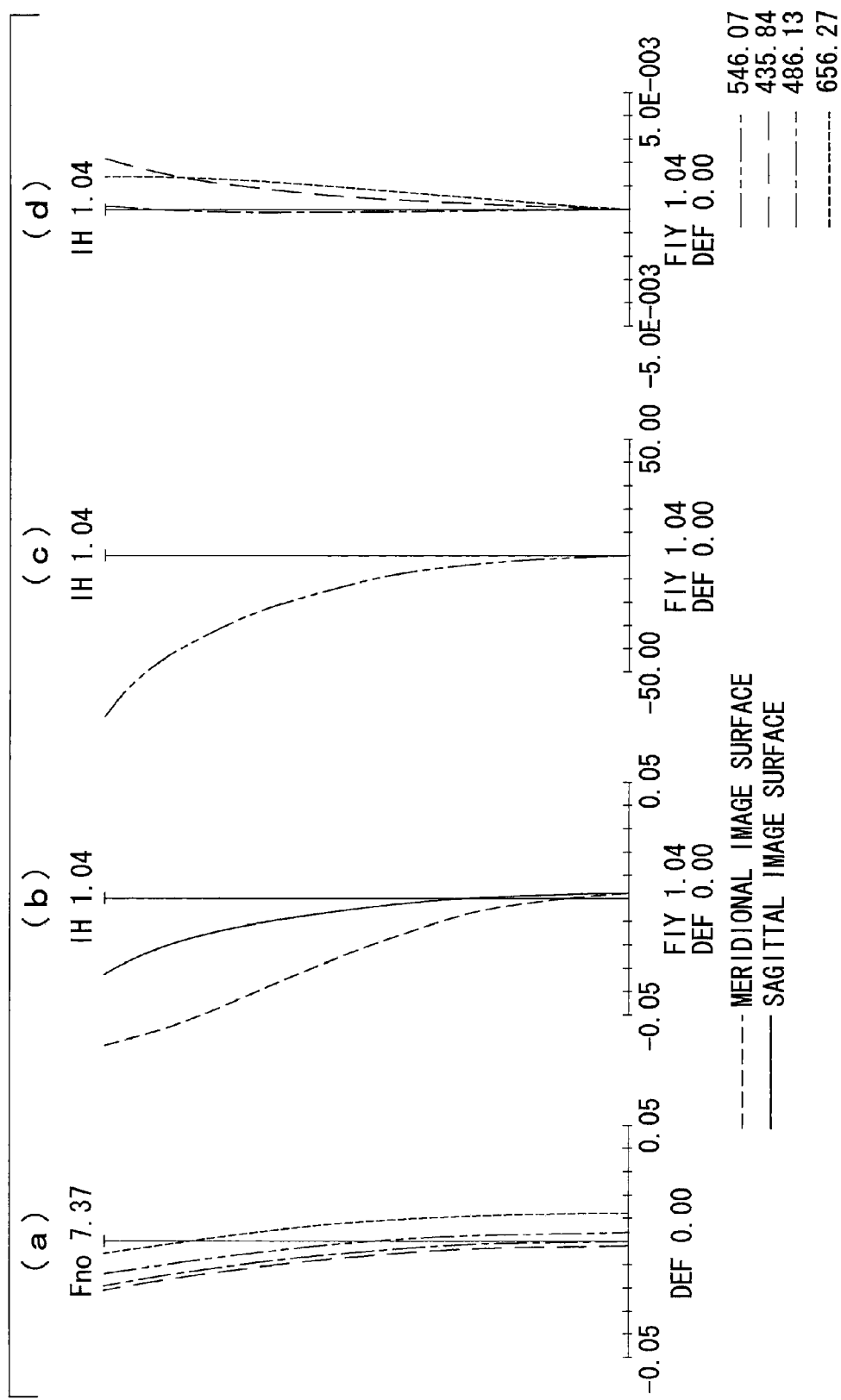
FIG. 15 is a diagram showing aberration curves for the endoscope objective optical system in FIG. 14, for (a) spherical aberration, (b) astigmatism, (c) distortion, and (d) magnification chromatic aberration.

For an endoscope objective optical system according to Example 7 of the present invention, the configuration thereof is shown in FIG. 14, and the lens data and values of various paraxial quantities are shown below. In this Example, the flat-parallel plate is disposed on the rear side of the second group. FIG. 15 shows a diagram of the aberration curves for the endoscope objective optical system according to this Example.

| Lens data | | | | |
|---|---|---|---|---|
| Surface number | r | d | Ne | Vd |
| 1 | ∞ | 0.33 | 1.88815 | 40.76 |
| 2 | 0.662 | 0.55 | | |
| 3 | 3.448 | 1.28 | 1.67340 | 47.23 |
| 4 | −1.241 | 0.05 | | |
| 5 | Aperture stop | 1.22 | | |
| 6 | 3.259 | 0.88 | 1.73234 | 54.68 |
| 7 | −1.323 | 0.34 | 1.93429 | 18.90 |
| 8 | −3.396 | 0.10 | | |
| 9 | ∞ | 0.27 | 1.51500 | 75.00 |
| 10 | ∞ | 0.60 | | |
| 11 | ∞ | 0.65 | 1.51825 | 64.14 |
| 12 | ∞ | 0.50 | 1.51825 | 64.14 |
| 13 | Imaging surface | | | |

| Miscellaneous data | |
|---|---|
| Focal length | 1.01 |
| Fno | 7.71 |
| Distance to object point | 11.20 |
| Image height | 1.04 |

Example 8

Figure 16:
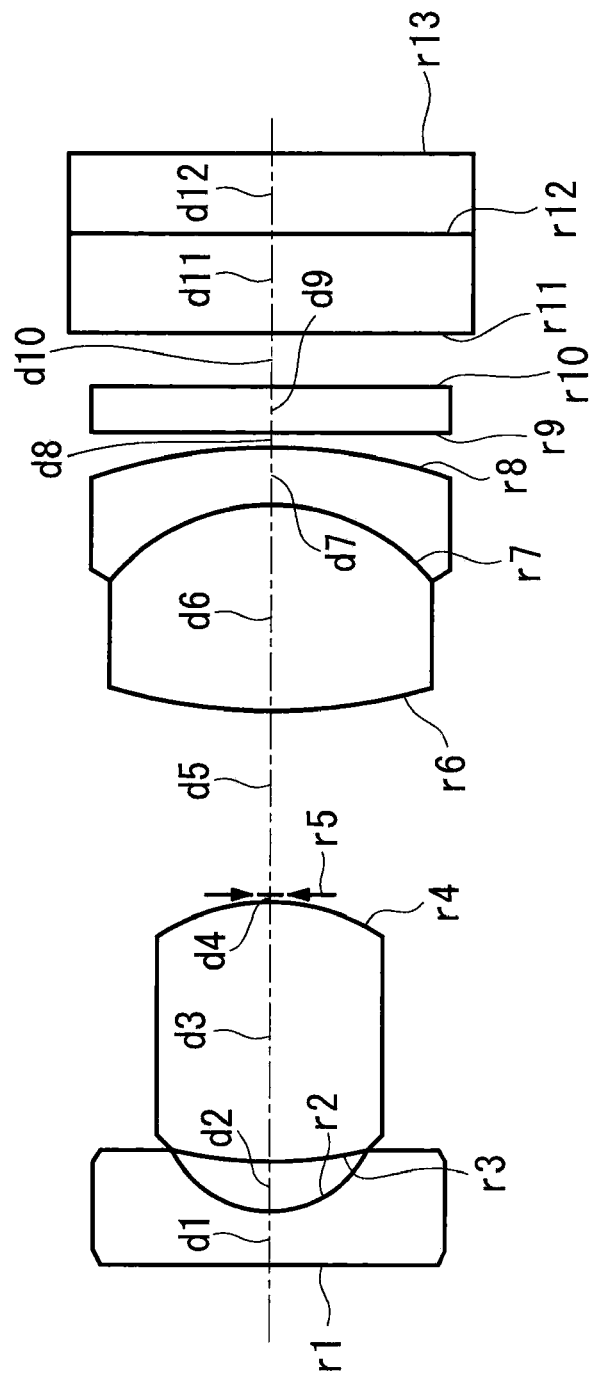
FIG. 16 is a cross-sectional view of lenses showing the overall configuration of an endoscope objective optical system according to Example 8 of the present invention.
Figure 17:
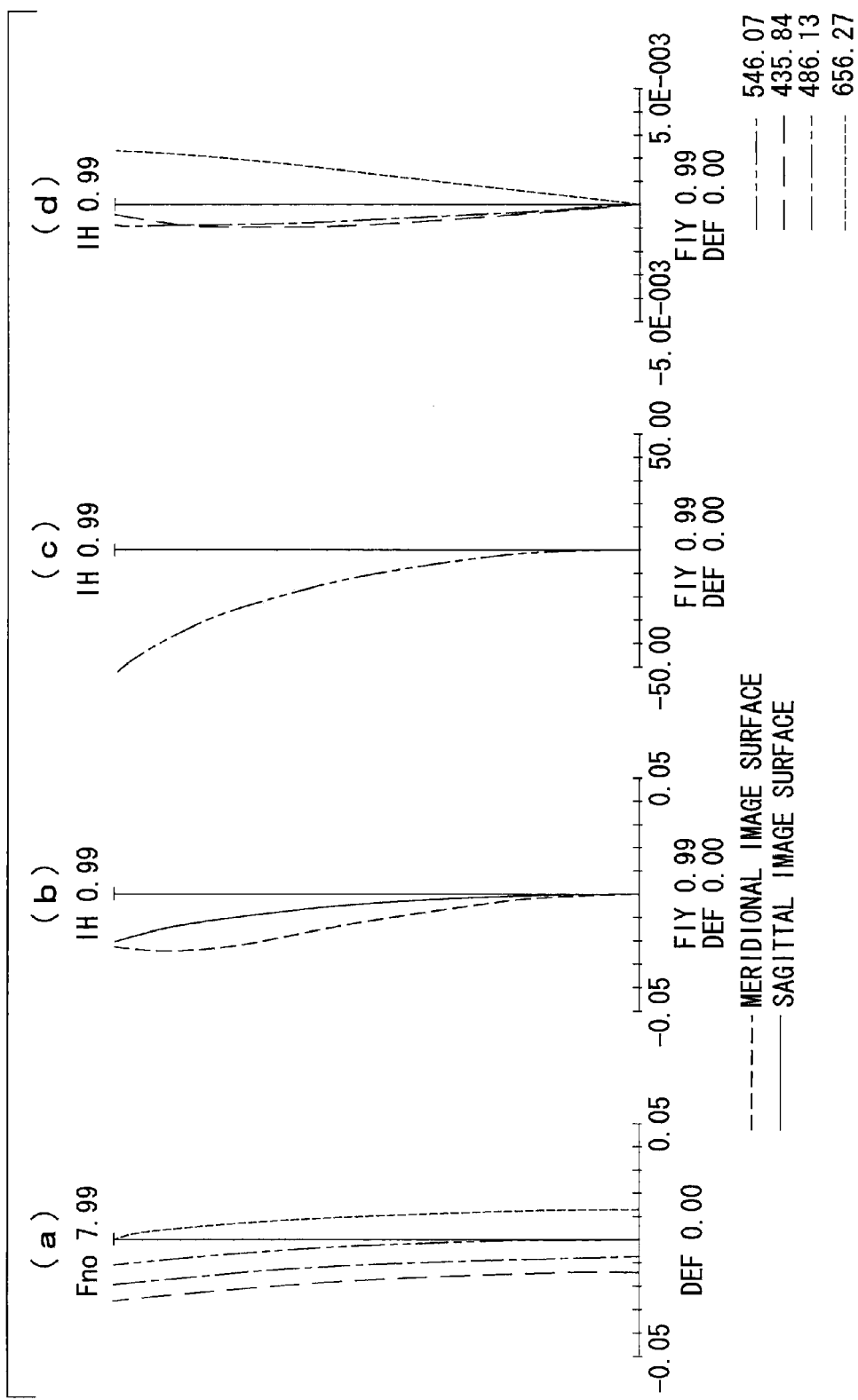
FIG. 17 is a diagram showing aberration curves for the endoscope objective optical system in FIG. 16, for (a) spherical aberration, (b) astigmatism, (c) distortion, and (d) magnification chromatic aberration.

For an endoscope objective optical system according to Example 8 of the present invention, the configuration thereof is shown in FIG. 16, and the lens data and values of various paraxial quantities are shown below. In this Example, the flat-parallel plate is disposed on the rear side of the second group. FIG. 17 shows a diagram of the aberration curves for the endoscope objective optical system according to this Example.

| Lens data | | | | |
|---|---|---|---|---|
| Surface number | r | d | Ne | Vd |
| 1 | ∞ | 0.29 | 1.88815 | 40.76 |
| 2 | 0.718 | 0.34 | | |
| 3 | 7.964 | 1.82 | 1.67340 | 47.23 |
| 4 | −1.190 | 0.05 | | |
| 5 | Aperture stop | 1.12 | | |
| 6 | 3.387 | 1.25 | 1.73234 | 54.68 |
| 7 | −1.234 | 0.32 | 1.93429 | 18.90 |
| 8 | −3.401 | 0.11 | | |
| 9 | ∞ | 0.28 | 1.51500 | 75.00 |
| 10 | ∞ | 0.35 | | |
| 11 | ∞ | 0.68 | 1.51825 | 64.14 |
| 12 | ∞ | 0.75 | 1.50700 | 63.26 |
| 13 | Imaging surface | | | |

| Miscellaneous data | |
|---|---|
| Focal length | 1.00 |
| Fno | 7.37 |
| Distance to object point | 9.00 |
| Image height | 1.04 |

Example 9

Figure 18:
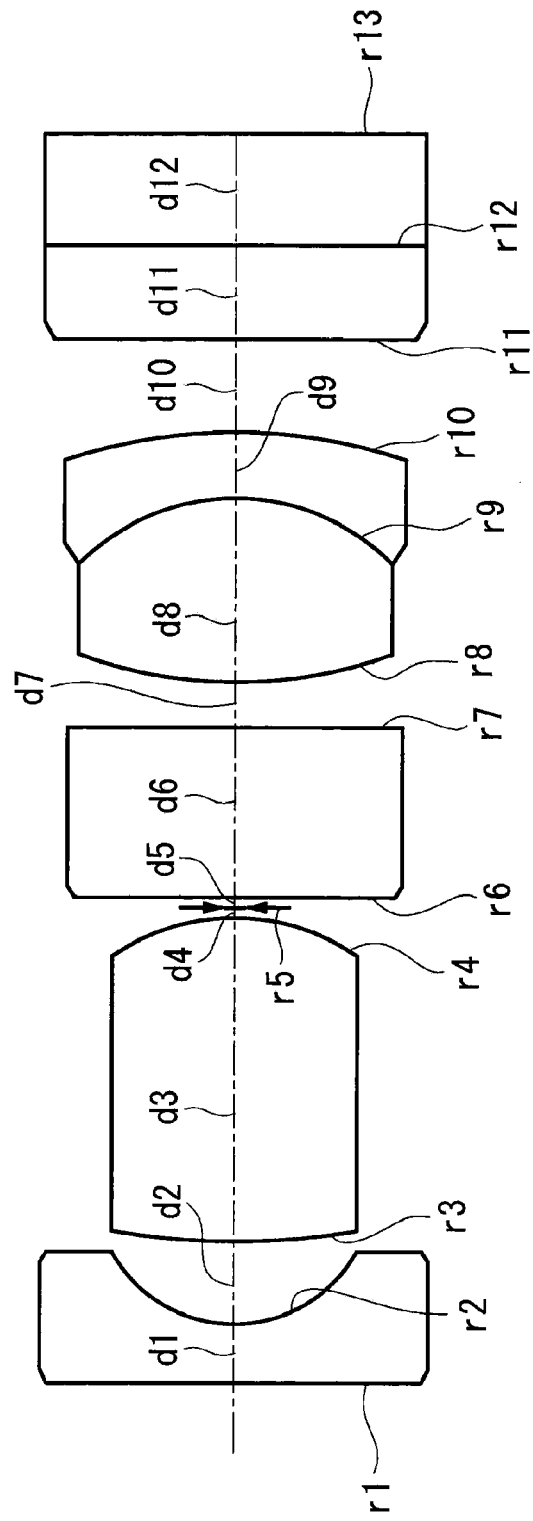
FIG. 18 is a cross-sectional view of lenses showing the overall configuration of an endoscope objective optical system according to Example 9 of the present invention.
Figure 19:
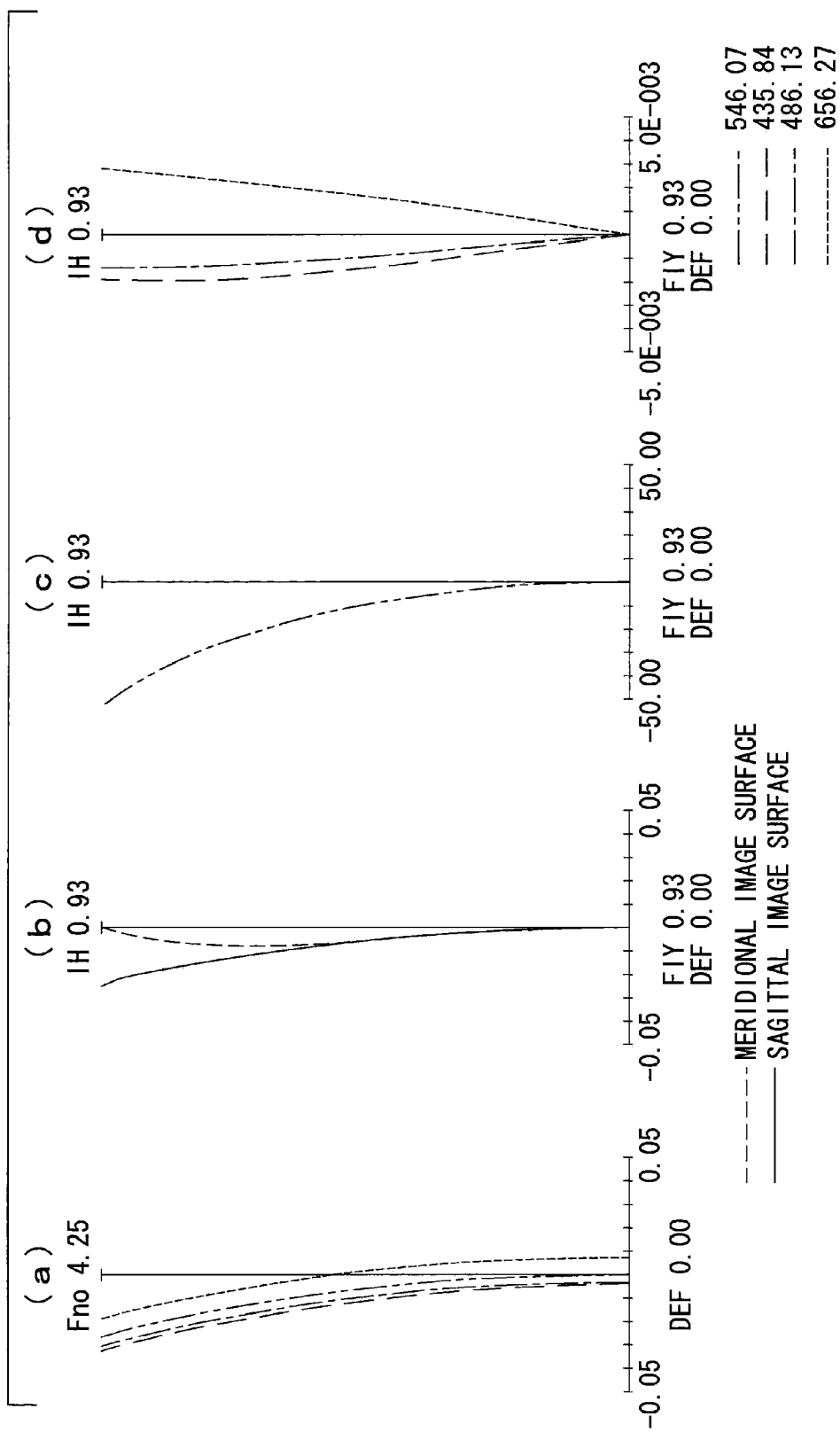
FIG. 19 is a diagram showing aberration curves for the endoscope objective optical system in FIG. 18, for (a) spherical aberration, (b) astigmatism, (c) distortion, and (d) magnification chromatic aberration.

For an endoscope objective optical system according to Example 9 of the present invention, the configuration thereof is shown in FIG. 18, and the lens data and values of various paraxial quantities are shown below. FIG. 19 shows a diagram of the aberration curves for the endoscope objective optical system according to this Example.

| Lens data | | | | |
|---|---|---|---|---|
| Surface number | r | d | Ne | Vd |
| 1 | ∞ | 0.31 | 1.88815 | 40.76 |
| 2 | 0.619 | 0.30 | | |
| 3 | 2.901 | 1.47 | 1.74678 | 49.34 |
| 4 | −1.127 | 0.05 | | |
| 5 | Aperture stop | 1.06 | | |
| 6 | 3.693 | 1.18 | 1.77621 | 49.60 |
| 7 | −1.211 | 0.32 | 1.93429 | 18.90 |
| 8 | −3.450 | 0.10 | | |
| 9 | ∞ | 0.25 | 1.51500 | 75.00 |
| 10 | ∞ | 0.32 | | |
| 11 | ∞ | 0.55 | 1.50700 | 63.26 |
| 12 | ∞ | 0.45 | 1.61350 | 50.50 |
| 13 | Imaging surface | | | |

| Miscellaneous data | |
|---|---|
| Focal length | 1.00 |
| Fno | 7.99 |
| Distance to object point | 8.50 |
| Image height | 0.99 |

Example 10

Figure 20:
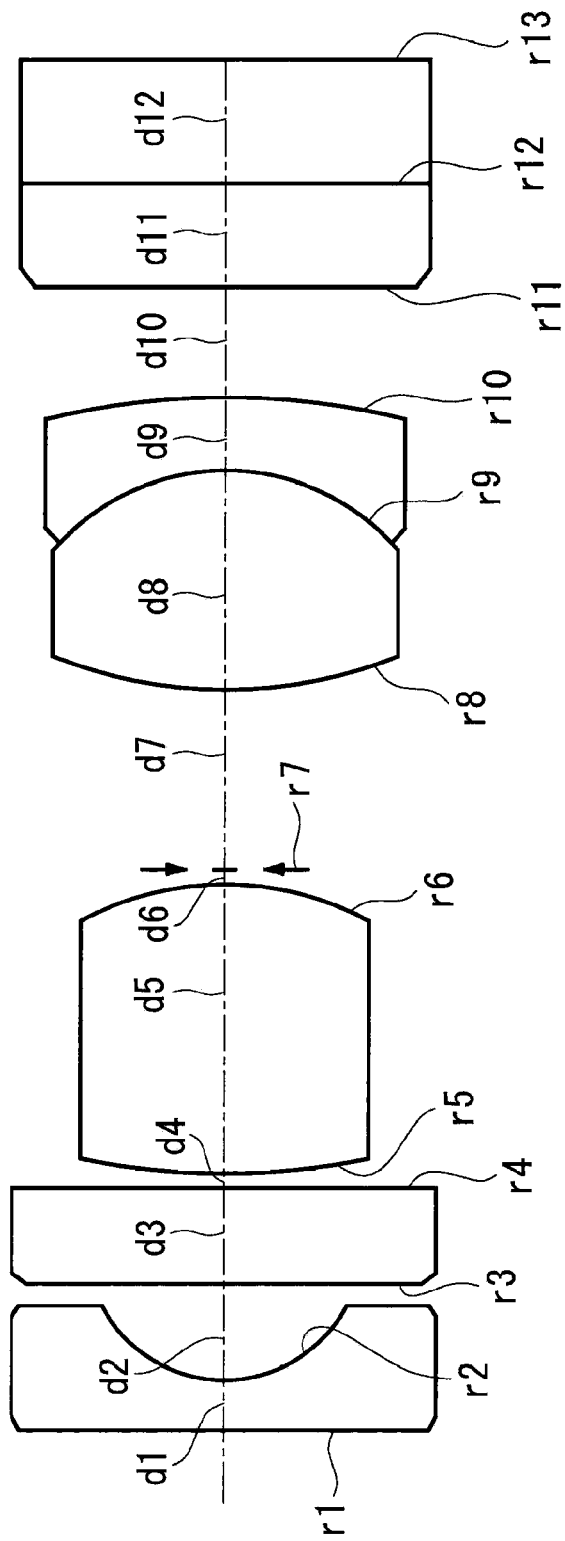
FIG. 20 is a cross-sectional view of lenses showing the overall configuration of an endoscope objective optical system according to Example 10 of the present invention.
Figure 21:
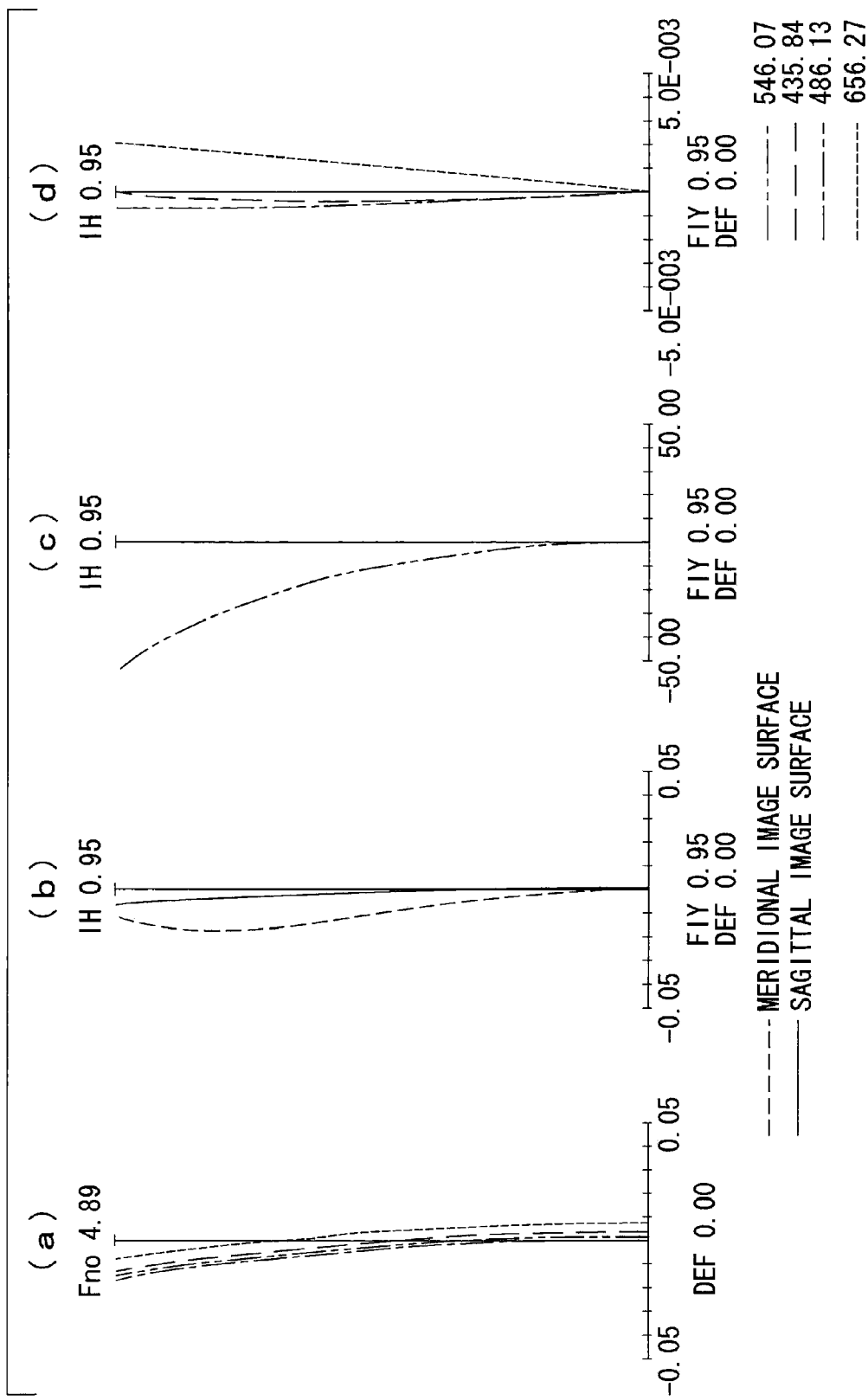
FIG. 21 is a diagram showing aberration curves for the endoscope objective optical system in FIG. 20, for (a) spherical aberration, (b) astigmatism, (c) distortion, and (d) magnification chromatic aberration.

For an endoscope objective optical system according to Example 10 of the present invention, the configuration thereof is shown in FIG. 20, and the lens data and values of various paraxial quantities are shown below. In this Example, the flat-parallel plate is disposed between the first lens and the second lens of the first group. FIG. 21 shows a diagram of the aberration curves for the endoscope objective optical system according to this Example.

| Lens data | | | | |
|---|---|---|---|---|
| Surface number | r | d | Ne | Vd |
| 1 | ∞ | 0.36 | 1.88815 | 40.76 |
| 2 | 0.848 | 0.55 | | |
| 3 | 3.711 | 2.00 | 1.67340 | 47.23 |
| 4 | −1.521 | 0.10 | | |
| 5 | Aperture stop | 0.05 | | |
| 6 | ∞ | 1.08 | 1.52300 | 66.50 |
| 7 | ∞ | 0.28 | | |
| 8 | 2.880 | 1.18 | 1.73234 | 54.68 |
| 9 | −1.355 | 0.38 | 1.93429 | 18.90 |
| 10 | −3.671 | 0.60 | | |
| 11 | ∞ | 0.60 | 1.51825 | 64.14 |
| 12 | ∞ | 0.72 | 1.61350 | 50.50 |
| 13 | Imaging surface | | | |

| Miscellaneous data | |
|---|---|
| Focal length | 1.00 |
| Fno | 4.25 |
| Distance to object point | 18.80 |
| Image height | 0.93 |

Example 11

Figure 22:
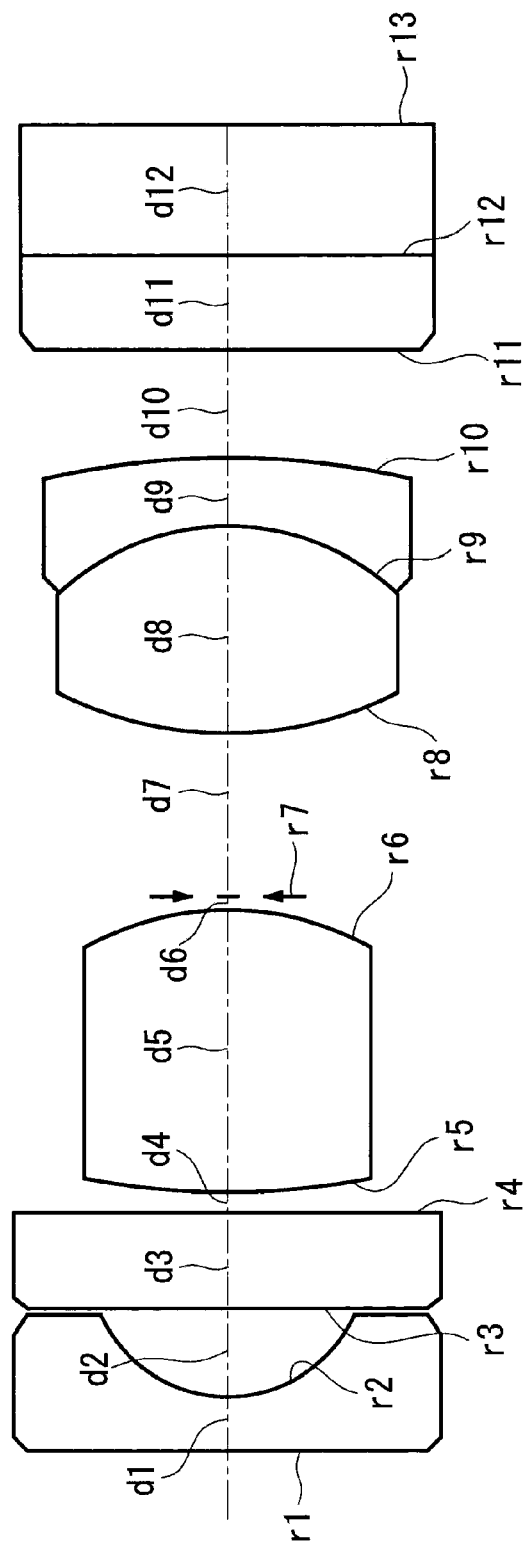
FIG. 22 is a cross-sectional view of lenses showing the overall configuration of an endoscope objective optical system according to Example 11 of the present invention.
Figure 23:
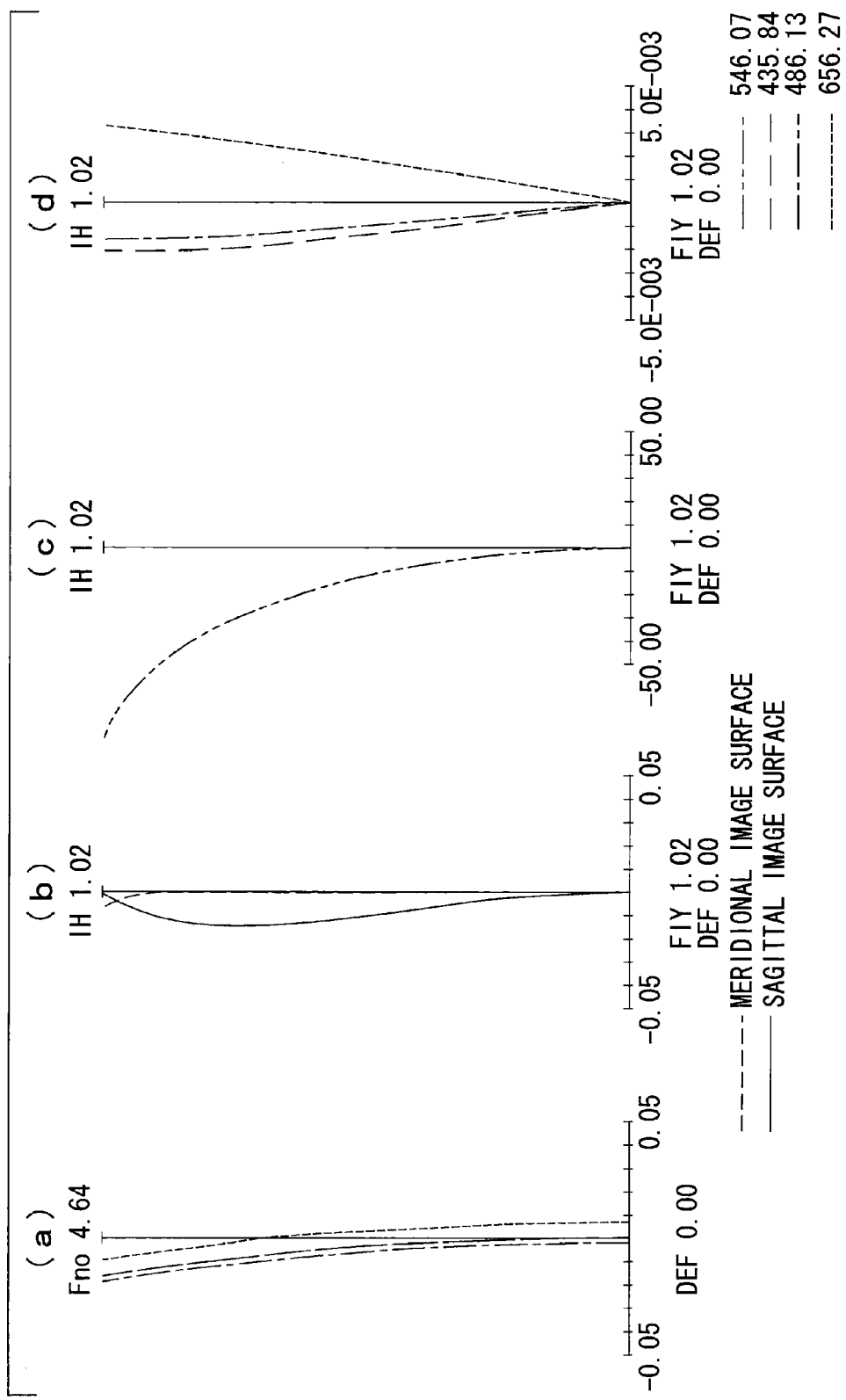
FIG. 23 is a diagram showing aberration curves for the endoscope objective optical system in FIG. 22, for (a) spherical aberration, (b) astigmatism, (c) distortion, and (d) magnification chromatic aberration.

For an endoscope objective optical system according to Example 11 of the present invention, the configuration thereof is shown in FIG. 22, and the lens data and values of various paraxial quantities are shown below. In this Example, the flat-parallel plate is disposed between the first lens and the second lens of the first group. FIG. 23 shows a diagram of the aberration curves for the endoscope objective optical system according to this Example.

| Lens data | | | | |
|---|---|---|---|---|
| Surface number | r | d | Ne | Vd |
| 1 | ∞ | 0.32 | 1.88815 | 40.76 |
| 2 | 0.888 | 0.55 | | |
| 3 | ∞ | 0.57 | 1.51500 | 75.00 |
| 4 | ∞ | 0.12 | | |
| 5 | 6.292 | 1.69 | | |
| 6 | −1.903 | 0.10 | 1.74678 | 49.34 |
| 7 | Aperture stop | 1.08 | | |
| 8 | 2.874 | 1.33 | 1.73234 | 54.68 |
| 9 | −1.372 | 0.42 | 1.93429 | 18.90 |
| 10 | −4.685 | 0.68 | | |
| 11 | ∞ | 0.60 | 1.51825 | 64.14 |
| 12 | ∞ | 0.74 | 1.50700 | 63.26 |
| 13 | Imaging surface | | | |

| Miscellaneous data | |
|---|---|
| Focal length | 1.00 |
| Fno | 4.89 |
| Distance to object point | 18.50 |
| Image height | 0.95 |

Lens data

| Surface number | r | d | Ne | Vd |
|---|---|---|---|---|
| 1 | ∞ | 0.35 | 1.88815 | 40.76 |
| 2 | 0.916 | 0.58 | | |
| 3 | ∞ | 0.62 | 1.51500 | 75.00 |
| 4 | ∞ | 0.13 | | |
| 5 | 6.689 | 1.80 | | |
| 6 | −2.028 | 0.10 | 1.74678 | 49.34 |
| 7 | Aperture stop | 1.05 | | |
| 8 | 2.929 | 1.35 | 1.73234 | 54.68 |
| 9 | −1.529 | 0.42 | 1.93429 | 18.90 |
| 10 | −5.070 | 0.70 | | |
| 11 | ∞ | 0.65 | 1.51825 | 64.14 |
| 12 | ∞ | 0.80 | 1.50700 | 63.26 |
| 13 | Imaging surface | | | |

Miscellaneous data

| | |
|---|---|
| Focal length | 1.00 |
| Fno | 4.64 |
| Distance to object point | 20.00 |
| Image height | 1.02 |

Table 1 shows values of Conditional Expressions (1) to (26) for the configurations of the individual Examples 1 to 11.

$$1.39 < f31/f < 1.5 \quad (1')$$

$$-2.8 < f32/f < -1.98 \quad (2)$$

$$-2.52 < f32/f < -2.18 \quad (2')$$

$$0.38 < |R4+R3|/|R4-R3| < 0.77 \quad (3)$$

$$0.6 < g1/g2 < 1.08 \quad (4)$$

Here, $f31$ is the focal length of the third lens, $f32$ is the focal length of the fourth lens, $f$ is the focal length of the entire system, $R3$ is the radius of curvature of the object-side surface of the second lens, $R4$ is the radius of curvature of the image-side surface of the second lens, $g1$ is the focal length of the first group, and $g2$ is the focal length of the second group.

$$2 < g1/f < 3.2 \quad (5)$$

$$2.9 < g2/f < 3.6 \quad (6)$$

$$-1.2 < R5/R7 < -0.5 \quad (7)$$

Here, $R5$ is the radius of curvature of the object-side surface of the third lens, and $R7$ is the radius of curvature of the image-side surface of the fourth lens.

TABLE 1

| Conditional Expression | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| (1) | 1.44 | 1.49 | 1.37 | 1.34 | 1.35 | 1.39 | 1.39 | 1.31 | 1.43 | 1.46 | 1.58 |
| (2) | −2.43 | −2.58 | −2.20 | −2.00 | −2.31 | −2.50 | −2.23 | −2.14 | −2.50 | −2.21 | −2.49 |
| (3) | 0.47 | 0.52 | 0.52 | 0.43 | 0.47 | 0.47 | 0.74 | 0.44 | 0.42 | 0.54 | 0.53 |
| (4) | 0.67 | 0.66 | 0.88 | 0.96 | 0.98 | 0.92 | 0.82 | 0.69 | 0.99 | 0.87 | 0.91 |
| (5) | 2.22 | 2.15 | 2.78 | 2.92 | 2.93 | 2.78 | 2.67 | 2.09 | 2.95 | 2.99 | 3.18 |
| (6) | 3.29 | 3.27 | 3.15 | 3.04 | 3.00 | 3.01 | 3.26 | 3.05 | 2.98 | 3.43 | 3.50 |
| (7) | −1.08 | −0.82 | −0.90 | −1.00 | −0.99 | −0.96 | −1.00 | −1.07 | −0.78 | −0.61 | −0.58 |
| (8) | −10.53 | −8.29 | −9.62 | −8.82 | −10.06 | −9.99 | −10.63 | −10.78 | −9.66 | −11.15 | −12.07 |
| (9) | 3.64 | 3.25 | 3.11 | 3.37 | 3.19 | 3.23 | 3.38 | 3.68 | 2.88 | 2.87 | 2.93 |
| (10) | −3.36 | −3.99 | −3.46 | −3.35 | −3.22 | −3.36 | −3.40 | −3.44 | −3.67 | −4.68 | −5.08 |
| (11) | 0.32 | 0.48 | 0.36 | 0.38 | 0.32 | 0.34 | 0.32 | 0.32 | 0.38 | 0.42 | 0.42 |
| (12) | −1.36 | −1.36 | −1.75 | −1.61 | −1.15 | −1.23 | −1.19 | −1.12 | −1.52 | −1.90 | −2.03 |
| (13) | 3.76 | 4.25 | 5.54 | 4.01 | 3.21 | 3.42 | 7.95 | 2.89 | 3.71 | 6.28 | 6.70 |
| (14) | −0.79 | −0.82 | −0.99 | −0.93 | −0.71 | −0.74 | −0.81 | −0.69 | −0.95 | −1.00 | −1.03 |
| (15) | 1.53 | 1.62 | 1.97 | 1.82 | 1.46 | 1.51 | 1.67 | 1.28 | 1.89 | 2.14 | 2.29 |
| (16) | 1.64 | 1.62 | 2.17 | 2.43 | 1.46 | 1.27 | 1.82 | 1.46 | 2.00 | 1.69 | 1.80 |
| (17) | −1.29 | −1.41 | −1.23 | −1.13 | −1.23 | −1.31 | −1.23 | −1.21 | −1.35 | −1.37 | −1.53 |
| (18) | 0.70 | 0.73 | 0.88 | 0.82 | 0.63 | 0.66 | 0.72 | 0.62 | 0.85 | 0.89 | 0.92 |
| (19) | 0.43 | 0.42 | 0.35 | 0.33 | 0.32 | 0.33 | 0.29 | 0.31 | 0.36 | 0.32 | 0.35 |
| (20) | 0.49 | 0.60 | 0.61 | 0.27 | 0.36 | 0.54 | 0.34 | 0.30 | 0.55 | 1.04 | 1.13 |
| (21) | 0.04 | 0.04 | 0.03 | 0.03 | 0.05 | 0.05 | 0.05 | 0.05 | 0.10 | 0.10 | 0.10 |
| (22) | 1.06 | 1.37 | 1.07 | 0.58 | 1.00 | 1.21 | 1.12 | 1.06 | 1.04 | 1.08 | 1.05 |
| (23) | 1.15 | 1.23 | 1.30 | 1.89 | 1.08 | 0.87 | 1.25 | 1.18 | 1.18 | 1.33 | 1.35 |
| (24) | 67.30 | 81.70 | 80.70 | 67.10 | 66.10 | 79.70 | 75.70 | 66.00 | 64.40 | 65.80 | 81.00 |
| (25) | 0.90 | 0.94 | 1.03 | 0.96 | 0.78 | 0.83 | 0.82 | 0.76 | 1.08 | 1.06 | 1.14 |
| (26) | 7.28 | 7.77 | 8.23 | 7.94 | 6.65 | 6.71 | 7.36 | 6.36 | 7.89 | 8.20 | 8.56 |

The inventions according to the following Additional Items can be derived from the above-described Examples 1 to 11.

(Additional Items)

An endoscope objective optical system that is constituted of, in order from the object side, a first group, an aperture stop and a second group, wherein the first group has a positive power and is constituted of a negative first lens whose surface on the object side is flat and a positive second lens; the second group has positive power and is constituted of a combined lens formed of a positive third lens and a negative fourth lens; the following Conditional Expressions (1) to (3) or (1'), (2'), and (4) are satisfied; and, furthermore, at least one of the following Conditional Expressions (5) to (26) is satisfied.

$$1.2 < f31/f < 1.55 \quad (1)$$

$$-12.4 < R7/D7 < -8 \quad (8)$$

Here, $D7$ is the thickness of the fourth lens along the optical axis.

$$2.7 < R5/f < 3.85 \quad (9)$$

$$-5.3 < R7/f < -3.2 \quad (10)$$

$$0.3 < D7/f < 0.52 \quad (11)$$

$$-2.22 < R4/f < -0.98 \quad (12)$$

Here, $R4$ is the radius of curvature of the image-side surface of the second lens.

$$2.5 < R3/f < 9.2 \quad (13)$$

Here, R3 is the radius of curvature of the object-side surface of the second lens.

$$-1.05 < f1/f < -0.65 \quad (14)$$

Here, f1 is the focal length of the first lens.

$$1.25 < f2/f < 2.6 \quad (15)$$

Here, f2 is the focal length of the second lens.

$$1.25 < D3/f < 2.55 \quad (16)$$

Here, D3 is the thickness of the second lens along the optical axis.

$$-1.7 < R6/f < -1 \quad (17)$$

Here, R6 is the radius of curvature of the joining surface between the third lens and the fourth lens.

$$0.55 < R2/f < 0.95 \quad (18)$$

Here, R2 is the radius of curvature of the image-side surface of the first lens.

$$0.29 < D1/f < 0.5 \quad (19)$$

Here, D1 is the thickness of the first lens along the optical axis.

$$0.24 < D2/f < 1.5 \quad (20)$$

Here, D2 is the air-equivalent length along the optical axis between the image-side surface of the first lens and the object-side surface of the second lens.

$$0 < D4/f < 0.2 \quad (21)$$

Here, D46 is the distance along the optical axis between the image-side surface of the second lens and the aperture stop.

$$0.18 < D5/f < 1.56 \quad (22)$$

Here, D5 is the distance along the optical axis between the aperture stop and the object-side surface of the third lens.

$$0.85 < D6/f < 2 \quad (23)$$

Here, D6 is the thickness of the third lens along the optical axis.

$$\omega > 62 \quad (24)$$

$$rh1/IH < 1.25 \quad (25)$$

Here, rh1 is the maximum ray height at the object-side surface of the first lens, and IH is the image height.

$$LT/f < 9.5 \quad (26)$$

Here, LT is the total length of the lens (the distance from the object-side surface of the first lens to the image plane).

{Reference Signs List}
1 endoscope objective optical system
G1 first group
G2 second group
L1 first lens
L2 second lens
L3 third lens
L4 fourth lens
L34 combined lens
S aperture stop
F flat-parallel plate
CG cover glass

The invention claimed is:

1. An endoscope objective optical system comprising, in order from an object side:
a first group;
an aperture stop; and
a second group,
wherein the first group has positive power and is constituted of a negative first lens whose surface on the object side is flat and a positive second lens;
the second group has positive power and is constituted of a combined lens formed of a positive third lens and a negative fourth lens; and
the following Conditional Expressions (1) to (3) are satisfied:

$$1.2 < f31/f < 1.55, \quad (1)$$

$$-2.8 < f32/f < -1.98, \text{ and} \quad (2)$$

$$0.38 < |R4+R3|/|R4-R3| < 0.77, \quad (3)$$

where
f31 is a focal length of the third lens,
f32 is a focal length of the fourth lens,
f is a focal length of the entire system,
R3 is a radius of curvature of the object-side surface of the second lens, and
R4 is a radius of curvature of the image-side surface of the second lens.

2. An endoscope objective optical system comprising, in order from an object side:
a first group;
an aperture stop; and
a second group,
wherein the first group has positive power and is constituted of a negative first lens whose surface on the object side is flat and a positive second lens;
the second group has positive power and is constituted of a combined lens formed of a positive third lens and a negative fourth lens; and
the following Conditional Expressions (1'), (2'), and (4) are satisfied:

$$1.39 < f31/f < 1.5, \quad (1')$$

$$-2.52 < f32/f < -2.18, \text{ and} \quad (2')$$

$$0.6 < g1/g2 < 1.08, \quad (4)$$

where
f31 is a focal length of the third lens,
f32 is a focal length of the fourth lens,
f is a focal length of an entire system,
g1 is a focal length of the first group, and
g2 is a focal length of the second group.

3. The endoscope objective optical system according to claim 1, wherein the following Conditional Expressions (1') and (2') are satisfied:

$$1.39 < f31/f < 1.5, \quad (1')$$

$$-2.52 < f32/f < -2.18, \text{ and} \quad (2')$$

4. The endoscope objective optical system according to claim 1, wherein the following Conditional Expression (4) is satisfied:

$$0.6 < g1/g2 < 1.08, \quad (4)$$

where
g1 is a focal length of the first group, and
g1 is a focal length of the second group.

* * * * *

UNITED STATES PATENT AND TRADEMARK OFFICE
CERTIFICATE OF CORRECTION

PATENT NO. : 8,824,067 B2  
APPLICATION NO. : 13/892465  
DATED : September 2, 2014  
INVENTOR(S) : Hideyasu Takato Page 1 of 1

It is certified that error appears in the above-identified patent and that said Letters Patent is hereby corrected as shown below:

On the title page, item 73 Assignee should read: OLYMPUS MEDICAL SYSTEMS CORP.,
TOKYO (JP)

Signed and Sealed this
Twentieth Day of October, 2015

Michelle K. Lee
*Director of the United States Patent and Trademark Office*